(12) United States Patent
Jang et al.

(10) Patent No.: US 9,002,394 B2
(45) Date of Patent: Apr. 7, 2015

(54) METHOD, MOBILE AND BASE STATION FOR DIRECT MOBILE TO MOBILE COMMUNICATION

(75) Inventors: Ji Woong Jang, Anyang-si (KR); Han Gyu Cho, Anyang-si (KR); Yeong Hyeon Kwon, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 13/636,632

(22) PCT Filed: Feb. 18, 2011

(86) PCT No.: PCT/KR2011/001081
§ 371 (c)(1),
(2), (4) Date: Sep. 21, 2012

(87) PCT Pub. No.: WO2011/118912
PCT Pub. Date: Sep. 29, 2011

(65) Prior Publication Data
US 2013/0029713 A1 Jan. 31, 2013

Related U.S. Application Data

(60) Provisional application No. 61/316,368, filed on Mar. 22, 2010.

(51) Int. Cl.
*H04W 24/10* (2009.01)
*H04W 76/02* (2009.01)
*H04W 4/00* (2009.01)

(52) U.S. Cl.
CPC ............ *H04W 24/10* (2013.01); *H04W 76/023* (2013.01); *H04W 4/005* (2013.01)

(58) Field of Classification Search
None
See application file for complete search history.

(56) References Cited

U.S. PATENT DOCUMENTS

| 6,532,369 | B1 * | 3/2003 | Myer | 455/517 |
| 2008/0186915 | A1 * | 8/2008 | Kim et al. | 370/329 |
| 2010/0157826 | A1 * | 6/2010 | Yu et al. | 370/252 |

FOREIGN PATENT DOCUMENTS

| KR | 10-2007-0004370 | 1/2007 |
| KR | 10-2008-0072195 | 8/2008 |
| KR | 10-2008-0111681 | 12/2008 |

* cited by examiner

*Primary Examiner* — Philip Sobutka
(74) *Attorney, Agent, or Firm* — Lee, Hong, Degerman, Kang & Waimey

(57) ABSTRACT

According to the present invention, a source MS, determining initiation of M2M communication or receiving a request for initiating M2M communication from a BS, receives a reference signal for channel quality measurement of a neighboring MS, and the channel quality of the source MS and the neighboring MS is measured by using the reference signal; and information representing the channel quality is transmitted to the BS. Or, the neighboring MS receives a reference signal for channel quality measurement transmitted by the source MS, a channel quality of the source MS and the neighboring MS is measured by using the reference signal, and information representing the channel quality is transmitted to the BS. The BS determines a partner MS for M2M communication with the MS on the basis of a channel quality between the source MS and the neighboring MS.

8 Claims, 17 Drawing Sheets

----▶ Bad Link      ———▶ Good Link

METHOD, MOBILE AND BASE STATION FOR DIRECT MOBILE TO MOBILE COMMUNICATION

CROSS-REFERENCE TO RELATED APPLICATIONS

This application is the National Stage filing under 35 U.S.C. 371 of International Application No. PCT/KR2011/001081, filed on Feb. 18, 2011, which claims the benefit of U.S. Provisional Application Ser. No. 61/316,368, filed on Mar. 22, 2010, the contents of which are all hereby incorporated by reference herein in their entirety.

TECHNICAL FIELD

The present invention relates to a wireless communication system, and more particularly to, a method and apparatus for performing communication between mobile stations in a wireless communication system, and a method and apparatus for supporting communication between mobile stations.

BACKGROUND ART

A base station based communication system according to the related art is defined by communication between a base station or an entity equivalent to the base station and a mobile station, and all activities of communication are controlled by the base station or the entity equivalent to the base station. For example, the base station controls all activities of the mobile station, such as a data transmission power of the mobile station. In other words, according to the base station based communication system, the base station controls operations of all the mobile stations under predetermined rules to obtain maximum throughput. However, these rules may be inefficient depending on applications or channel status of the mobile station.

For example, in a state that the mobile station is included in a shade zone, if the mobile station performs communication with the base station through a neighboring mobile station having a good channel status, power efficiency and communication throughput of the mobile station may be improved. However, since a communication service should be provided to the mobile station through the base station in the current base station based communication system, a problem occurs in that the advantages of power efficiency and communication throughput cannot be obtained.

Also, according to the related art, since the mobile stations should perform communication with their neighboring mobile stations through the base station, they consume more power. In other words, an irrational communication structure is caused, in which communication data should be transmitted to a destination mobile station through the base station, even if communication is to be performed between neighboring mobile stations close to each other.

However, although the conventional base station based communication system does not allow direct communication between mobile stations, the conventional system supports a structure similar to the direct communication. For example, the mobile station may transmit and receive data to and from the base station through a relay node without performing direct communication with the base station. If the relay node is used, the mobile station may obtain higher spectral efficiency with smaller power than the power used by the mobile station to directly transmit data to the base station.

However, the greatest problem of the relay node is that the relay node is not the mobile station and operates as an access point for connection to a network. In other words, if the mobile station intends to transmit data to its neighboring mobile station, there is a load in that the mobile station should transmit data to the relay node. Also, although the relay node may be installed more easily than the base station, it has limitation in removing a shade zone and extending coverage in that it should be connected with the base station through a predetermined backbone network and has no mobility.

In order to solve the above problem, a method for supporting high rate transmission of large capacity data and performing direct communication between mobile stations having a good channel status to remove a shade zone and extend coverage has been suggested. The communication between mobile stations may be referred to as direct communication between mobile stations or cooperative communication between mobile stations in accordance with purpose of use for communication. The direct communication between mobile stations means that, if there is user data to be transmitted from a mobile station A to a mobile station B, the user data is transmitted to the mobile station B without passing through a base station. The cooperative communication between mobile stations means that, if a channel status between the mobile station A and the base station is not good, communication between the mobile station A and the base station is performed through the mobile station B having a good channel status with the mobile station A and the base station.

Currently, studies on communication between mobile stations are mainly ongoing for a transmission scheme or a method for grouping mobile stations joining in direct communication. In particular, most of studies are ongoing in such a manner that a new transmission scheme is suggested and the suggested transmission scheme has performance more improved than that of the related art schemes under a specific status. In other words, most of studies are ongoing on the assumption that all the mobile stations already know information required for communication between mobile stations. On the other hand, studies on initiation procedures of communication between mobile stations have been relatively little performed, wherein the studies on the initiation procedures include studies on how communication between mobile stations is performed, how communication between mobile stations is controlled by a base station, etc., and how information on neighboring mobile stations is collected to be transmitted to a base station.

DISCLOSURE

Technical Problem

Accordingly, an object of the present invention devised to solve the aforementioned problems is to provide a method and apparatus for initiating M2M communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for performing, by a first mobile station, a mobile station to mobile station communication with a second mobile station in a wireless communication system is provided. The method comprises: receiving reference signals for channel estimation, which are transmitted from one or more mobile stations; measuring channel quality between the one or more mobile stations and the first mobile station by using the reference signals for channel estimation; transmitting information indicating the channel quality between the one or more mobile stations and the first mobile station to a base station; receiving information indicating the second mobile station among the one or more mobile stations from the base station; and performing communication with the second mobile station.

According to another aspect of the present invention, a method for performing, by a first mobile station, a mobile station to mobile station communication of a first mobile station with a second mobile station in a wireless communication system is provided. The method comprises: transmitting reference signals for channel quality estimation between the first mobile station and one or more mobile stations to the one or more mobile stations; and receiving information indicating the second mobile station among the one or more mobile stations from a base station, wherein the second mobile station is determined on the basis of channel quality information between the first mobile station and the one or more mobile stations, the channel quality information being measured by each of the one or more mobile stations on the basis of the reference signals and transmitted to the base station.

According to still another aspect of the present invention, a method for supporting, by a base station, a mobile station to mobile station communication between a first mobile station and a second mobile station in a wireless communication system is provided. The method comprises: receiving information indicating channel quality between one or more mobile stations and the first mobile station from the first mobile station; determining the second mobile station among the one or more mobile stations on the basis of the information indicating channel quality; and transmitting information indicating the second mobile station to the first mobile station.

According to further still another aspect of the present invention, a method for supporting, by a base station, a mobile station to mobile station communication between a first mobile station and a second mobile station in a wireless communication system is provided. The method comprises: receiving information indicating channel quality between the first mobile station and one or more mobile stations from the one or more mobile station; determining the second mobile station among the one or more mobile stations on the basis of the information indicating channel quality; and transmitting information indicating the second mobile station to the first mobile station.

According to further still another aspect of the present invention, a first mobile station of performing a mobile station to mobile station communication with a second mobile station in a wireless communication system is provided. The first mobile station comprises: a receiver and a transmitter; and a processor configured to control the receiver and the transmitter, wherein the processor is configured to control the receiver to receive reference signals for channel estimation, which are transmitted from one or more mobile stations, configured to measure channel quality between the one or more mobile stations and the first mobile station by using the reference signals for channel estimation, configured to control the transmitter to transmit information indicating the channel quality between the one or more mobile stations and the first mobile station to a base station, configured to control the receiver to receive information indicating the second mobile station among the one or more mobile stations from the base station, and configured to control the transmitter and the receiver to perform communication with the second mobile station.

According to further still another aspect of the present invention, a first mobile station of performing a mobile station to mobile station communication with a second mobile station in a wireless communication system is provided. The first mobile station comprises: a receiver and a transmitter; and a processor configured to control the receiver and the transmitter, wherein the processor is configured to control the transmitter to transmit reference signals for channel quality between the first mobile station and one or more mobile stations to the one or more mobile stations and configured to control the receiver to receive information indicating the second mobile station among the one or more mobile stations from a base station, and wherein the second mobile station is determined on the basis of channel quality information between the first mobile station and the one or more mobile stations, the channel quality information being measured by each of the one or more mobile stations on the basis of the reference signals and transmitted to the base station.

According to further still another aspect of the present invention, a base station of supporting a mobile station to mobile station communication between a first mobile station and a second mobile station in a wireless communication system is provided. The base station comprises: a receiver and a transmitter; and a processor configured to control the receiver and the transmitter, wherein the processor is configured to control the receiver to receive information indicating channel quality between one or more mobile stations and the first mobile station from the first mobile station, configured to determine the second mobile station among the one or more mobile stations on the basis of the information indicating channel quality, and configured to control the transmitter to transmit information indicating the second mobile station to the first mobile station.

According to further still another aspect of the present invention, a base station of supporting a mobile station to mobile station communication between a first mobile station and a second mobile station in a wireless communication system is provided. The base station comprises: a receiver and a transmitter; and a processor configured to control the receiver and the transmitter, wherein the processor is configured to control the receiver to receive information indicating channel quality between the first mobile station and one or more mobile stations from the one or more mobile stations, configured to determine the second mobile station among the one or more mobile stations on the basis of the information indicating channel quality, and configured to control the transmitter to transmit information indicating the second mobile station to the first mobile station.

In each aspect of the present invention, the second mobile station may be determined considering channel quality between the one or more mobile stations and the base station together with the channel quality between the first mobile station and the one or more mobile stations.

The aforementioned technical solutions are only a part of the preferred embodiments of the present invention, and various modifications to which technical features of the present invention are applied could be understood by the person with ordinary skill in the art to which the present invention pertains, based on the following detailed description of the present invention.

Advantageous Effects

According to the present invention, the following advantages may be obtained.

According to the embodiments of the present invention, it is advantageous in that radio resources of time and frequency domains, which are used for an initiation procedure of M2M communication, may be reduced.

Also, according to the embodiments of the present invention, it is advantageous in that the existing reference signal may be used for an initiation procedure of M2M communication.

Moreover, according to the embodiments of the present invention, since the base station (BS) finally controls M2M communication, load of the mobile station (MS) having relatively poor calculation performance or power is reduced, and radio resources allocated to the BS may be used efficiently. Also, cooperative communication or direct communication between mobile stations may be performed efficiently for the entire system bandwidth.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
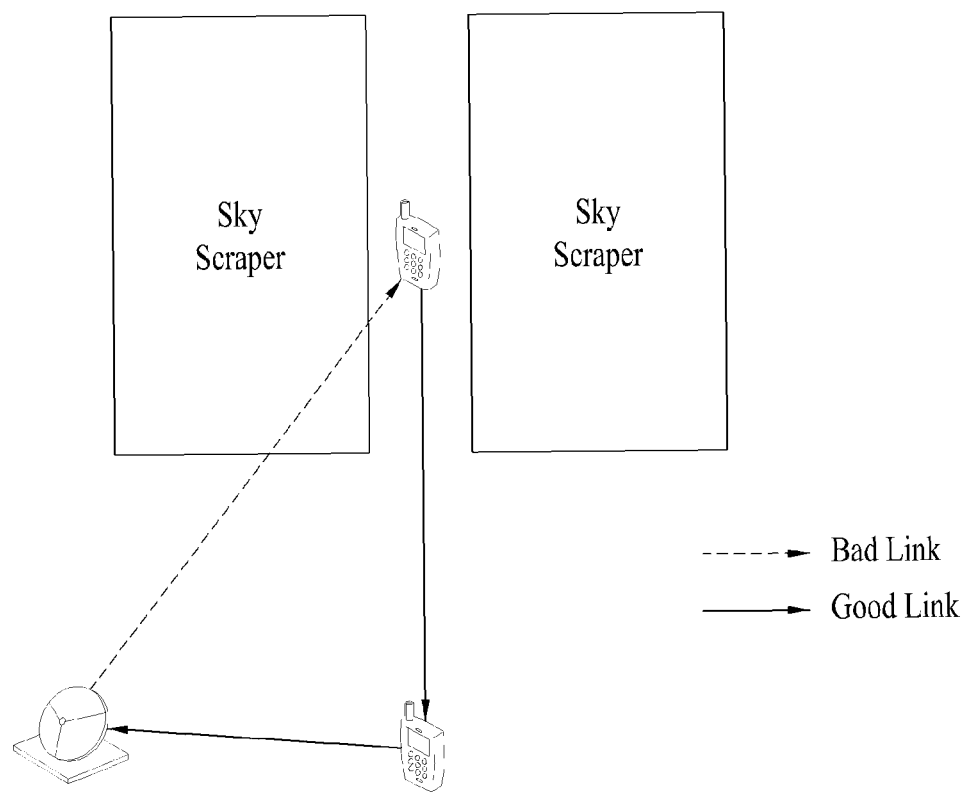
FIG. 1 to FIG. 3 are diagrams illustrating examples of initiation of mobile station-to-mobile station (M2M) communication.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Also, technique, device, and system, which will be described hereinafter, may be used for various wireless multiple access systems. Examples of the wireless multiple access systems include as a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, the user equipment may be fixed or may have mobility, and its examples include various equipments that transmit and receive user data and/or various kinds of control information to and from the base station through communication with the base station. The mobile station (MS) may be referred to as a terminal equipment (TE), a user equipment (UE), a mobile terminal (MT), a user terminal (UT), a subscriber station (SS), a wireless device, a personal digital assistant (PDA), a wireless modem, or a handheld device. Also, in the present invention, the base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

In the present invention, direct communication between mobile stations means a method for performing direct communication between mobile stations without a base station (BS) in a state that a channel status between two or more mobile stations is good or the respective mobile stations adjoin each other. At this time, each mobile station exchanges data with another mobile station through direct communication. Communication between mobile stations according to the present invention is different from Bluetooth communication and infrared communication in that predetermined control information for communication between mobile stations is provided by the base station (BS). In the Bluetooth communication and infrared communication, data are exchanged between mobile stations without involvement of a BS. Meanwhile, in case of client cooperative communication, a mobile station B, which assists communication of other mobile station, receives data to be transmitted by a mobile station A to a BS and transmits the received data to the BS, or receives data to be transmitted by the BS to the mobile station A and transmits the received data to the mobile station A. At this time, unidirectional or bidirectional communication between the mobile stations within a system bandwidth is performed. Accordingly, the client cooperative communication may be regarded as an example of communication between mobile stations.

The wireless communication system may support direct communication and client cooperative communication at the same time, or may support only one of the direct communication and the client cooperative communication. If the wireless communication system supports direct communication and client cooperative communication at the same time, a message requesting the direct communication may be different from that requesting the client cooperative communication or not. If the same message is used, the direct communication request may be identified from the client cooperative communication request by 1 bit indicator. Hereinafter, the direct communication between mobile stations and client cooperative communication will be referred to as mobile station-to-mobile station (MS-to-MS) (hereinafter, M2M) communication in the embodiments of the present invention.

In the present invention, a source mobile station (MS) means a mobile station that requests M2M communication, a mobile station that performs communication with a BS in accordance with assistance of another mobile station, or a mobile station that is requested communication with a BS in accordance with assistance of another mobile station. Also, in the present invention, a partner mobile station (MS) means a mobile station that is requested M2M communication from the source MS or the BS, or a mobile station that assists communication between the source MS and the BS.

Meanwhile, in the present invention, all the nodes except for the mobile station MS will be referred to as BS. For example, a relay node and an antenna node of a distributed antenna system will be referred to as a BS in view of an access point for accessing the BS. Accordingly, in the embodiments of the present invention, even in the case that the MS performs communication with the BS through the relay node, the communication will be referred to as communication of the BS and the MS that joins in M2M communication.

Figure 2:
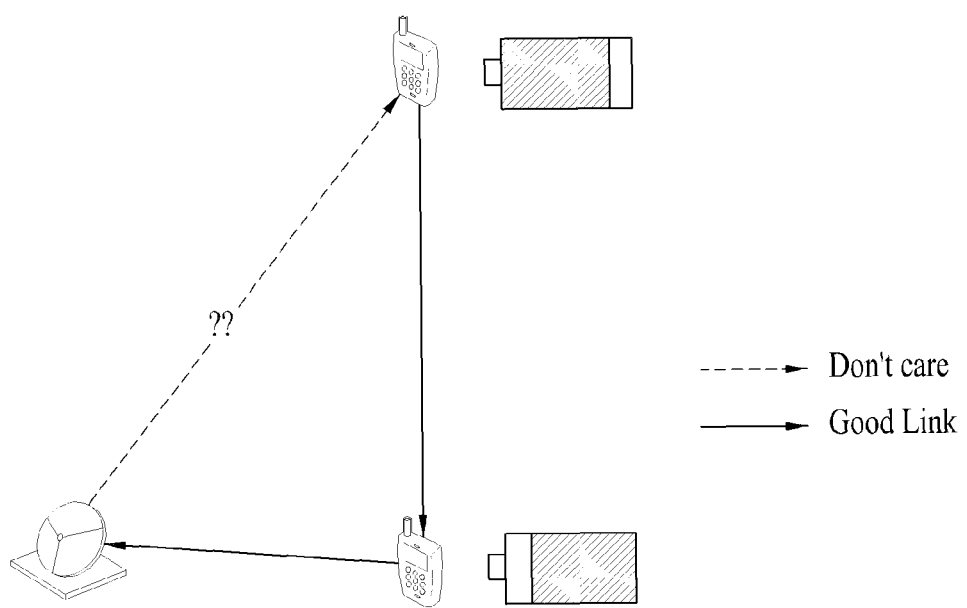
Figure 3:
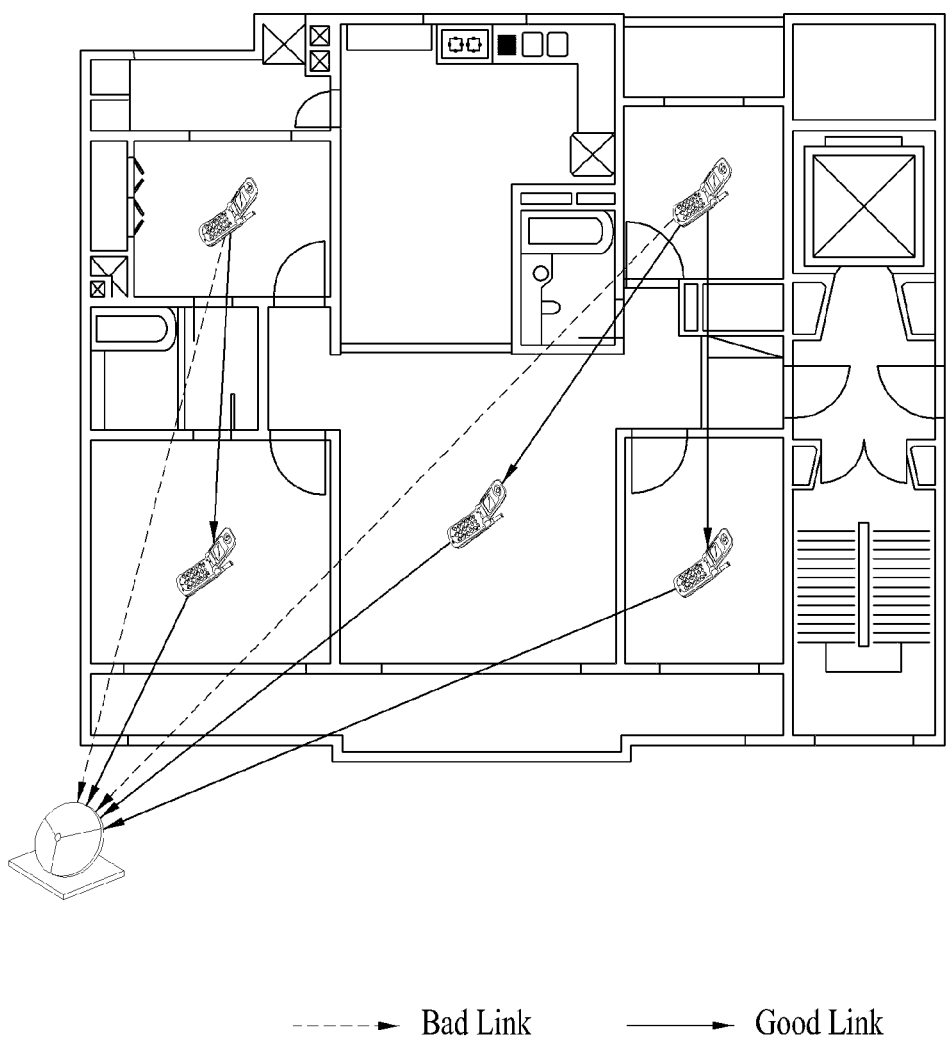

FIG. 1 to FIG. 3 are diagrams illustrating examples of initiation of mobile station-to-mobile station (M2M) communication.

If propagation loss is great or channel quality is less than a predetermined level between the source MS and the BS, M2M communication may be triggered. For example, referring to FIG. 1, if the source MS is located between skyscrapers and line of sight with the BS does not exist and/or if a channel status between the MS and the BS is not good due to great penetration loss, the M2M communication may be initiated.

In order to increase available communication time and standby communication time of the source MS regardless of the channel status between the source MS and the BS, the M2M communication may be initiated. For example, referring to FIG. 2, the source MS may increase the available communication time and standby communication time with small battery capacity by initiating the M2M communication.

Even in the case that the user of the source MS desires M2M communication due to high rate transmission or emergency status, the M2M communication may be initiated. For example, referring to FIG. 3, if a plurality of MSs are located indoor, since a channel status may be varied depending on the location of the MS, the source MS may improve data throughput or increase data reception quality through the M2M communication. Also, even in the case that the channel status between the source MS and the BS is not poor, the M2M communication may be initiated to improve a data transmission rate.

The M2M communication may be requested by the source MS or the BS. At any case, the source MS may perform M2M communication with a partner MS only if the partner MS is selected by the BS. A procedure of allocating a partner MS to a source MS in accordance with the M2M communication from the source MS or the BS will be referred to as M2M initiation procedure. The partner MS that performs M2M communication with the source MS should have both a good channel status with the source MS and a good channel status with the BS. In order that the BS selects a partner MS for a specific MS, channel measurement information on neighboring MSs, such as channel quality and/or interference information between neighboring MSs of the source MS and channel quality and/or interference information between the neighboring MSs and the BS, a battery status of the neighboring MS, information as to whether the neighboring MS performs M2M communication with another MS and/or radio resource status information are required. In other words, it is essentially required to collect channel information between the source MS and the neighboring MSs and status information on the neighboring MSs during the M2M communication initiation procedure. Hereinafter, the embodiments of the present invention, which collect channel information on the neighboring MSs and status information on the neighboring MSs, will be described. Although collection of channel information on the neighboring MSs will be described exemplarily in the present invention, the status information on the neighboring MSs may be collected in the same manner.

Figure 4:
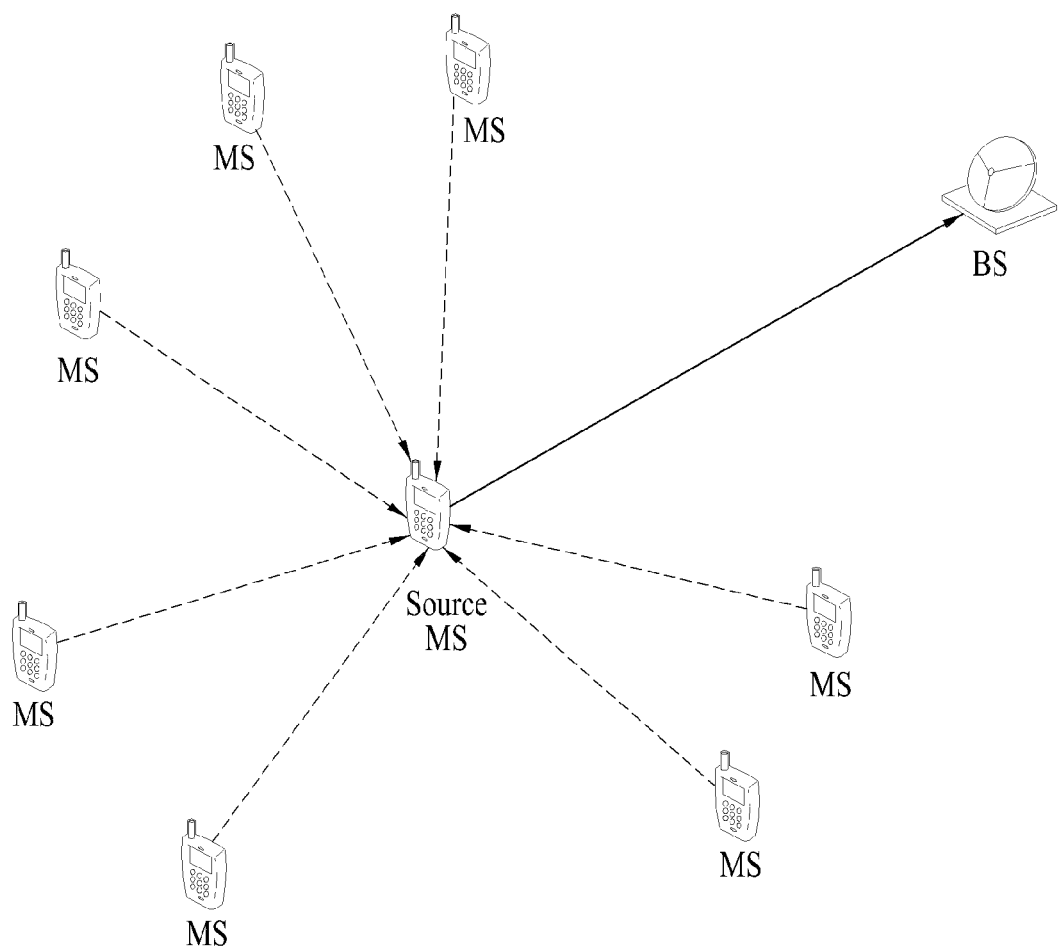
FIG. 4 is a diagram illustrating a first scheme of the present invention, which collects measurement information of neighboring mobile stations MSs of a source mobile station MS.

FIG. 4 is a diagram illustrating a first scheme of the present invention, which collects measurement information of neighboring MSs of a source MS. Referring to FIG. 4, according to the first scheme of the present invention, which collects information on neighboring MSs for M2M communication, the source MS collects measurement information on the neighboring MS and transmits the collected measurement information to a destination BS. In FIG. 4, a dotted line represents transmission of a reference signal for estimation of channel quality/status, and a solid line represents transmission of the estimated result to the destination BS. If the channel information between the source MS and the neighboring MS is collected in the same manner as FIG. 4, since only the source MS transmits channel information to the BS, it is advantageous in that additional resources for the neighboring MSs are not allocated.

FIG. 5 to FIG. 9 are diagrams illustrating examples of M2M communication initiation procedure according to the first scheme. Same reference numerals in FIG. 5 to FIG. 9 mean same operation. Also, an operation corresponding to reference numerals which do not exist in a corresponding drawing but exist in the other drawings represents an operation which is not performed in the corresponding drawing.

Referring to FIG. 5 to FIG. 9, the source MS may determine M2M communication and request the BS to initiate the M2M communication (S1000). In other words, the M2M communication may be initiated by the source MS. Otherwise, the BS may determine the M2M communication of the source MS and request the source MS to initiate the M2M communication (S1000). In other words, the M2M communication may be initiated by the BS.

Figure 6:
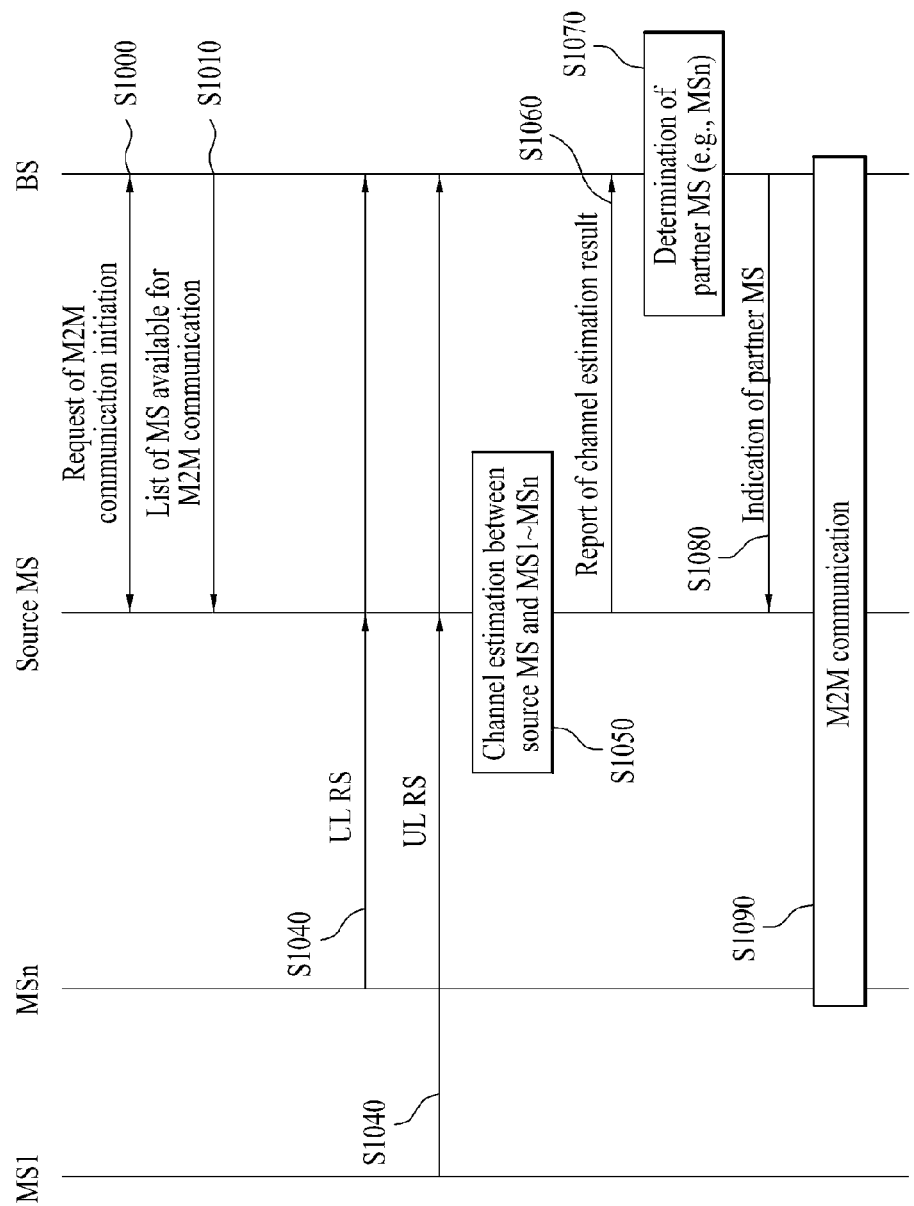
Figure 7:
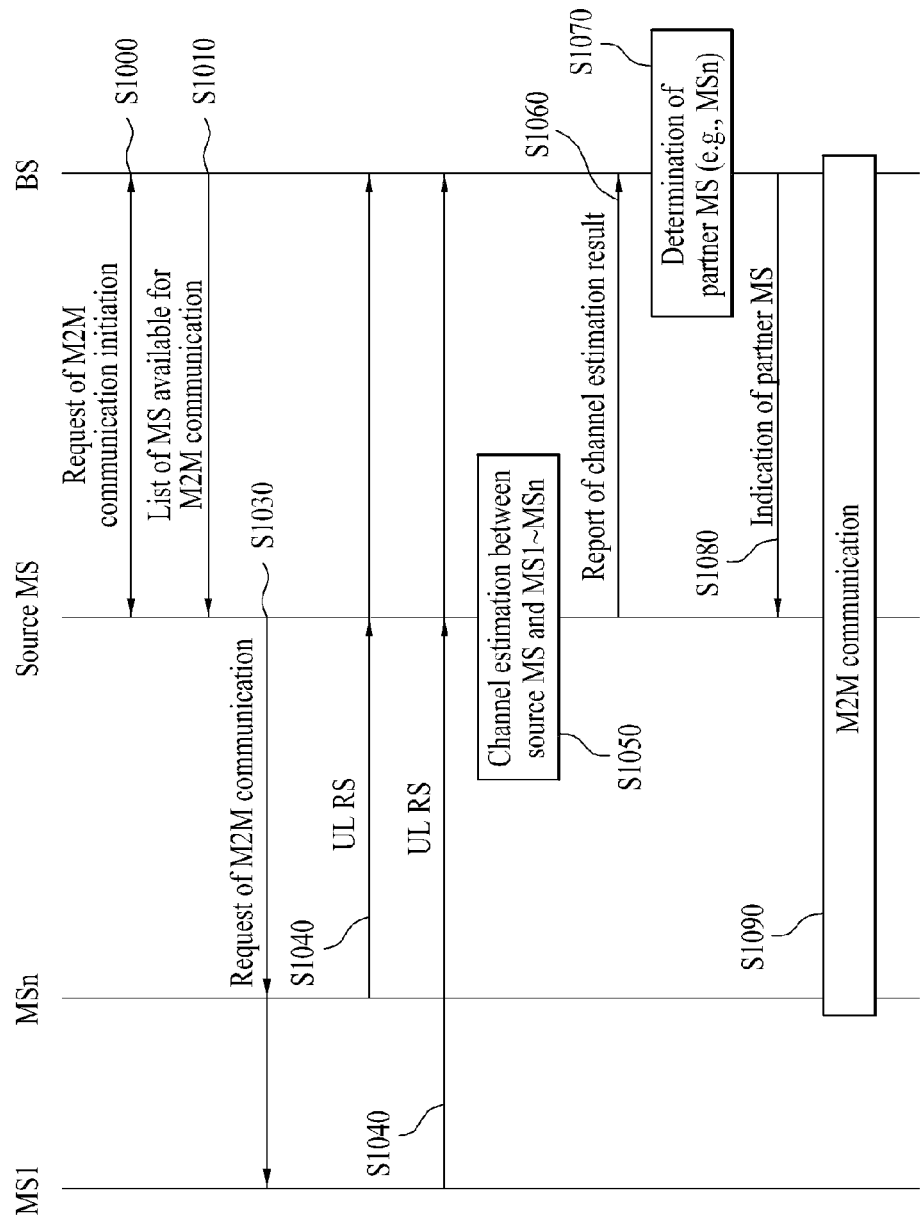
Figure 8:
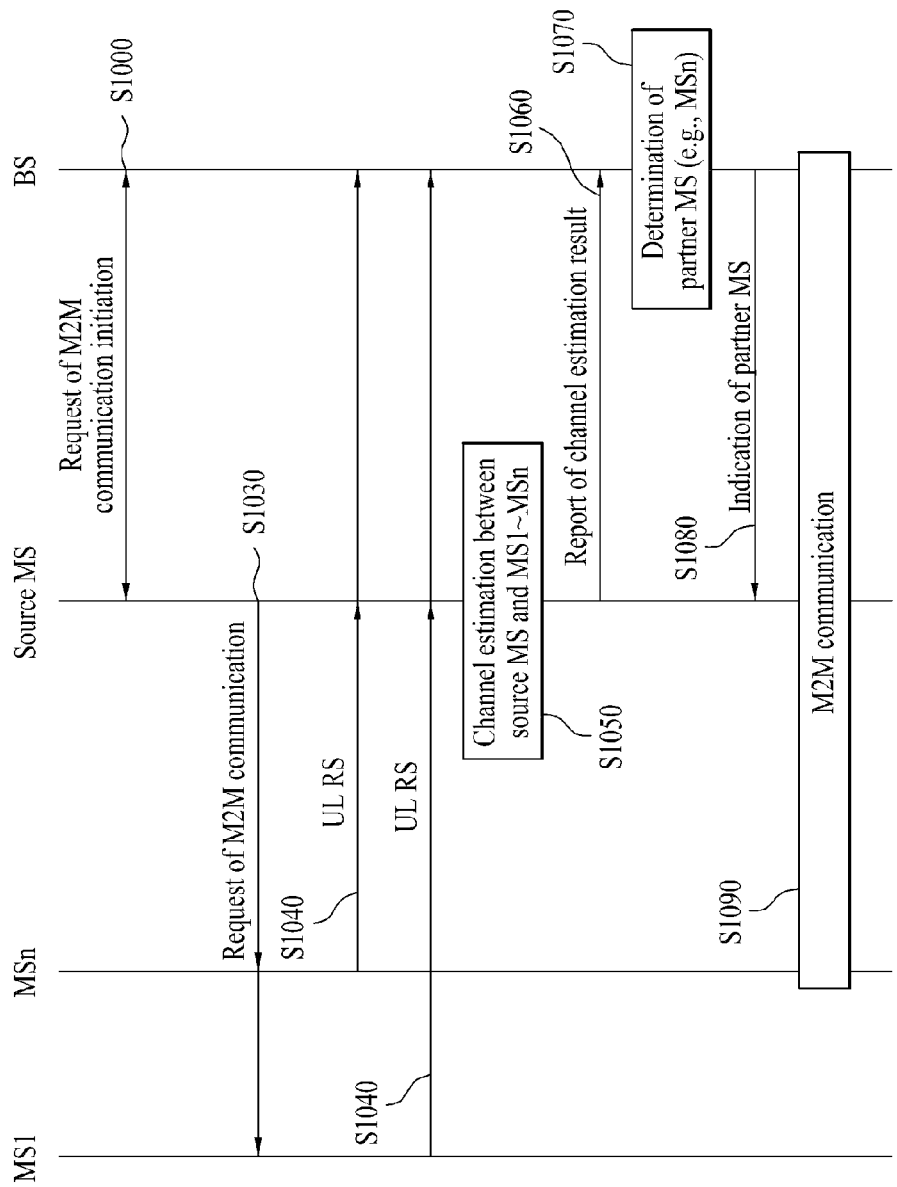
Figure 9:
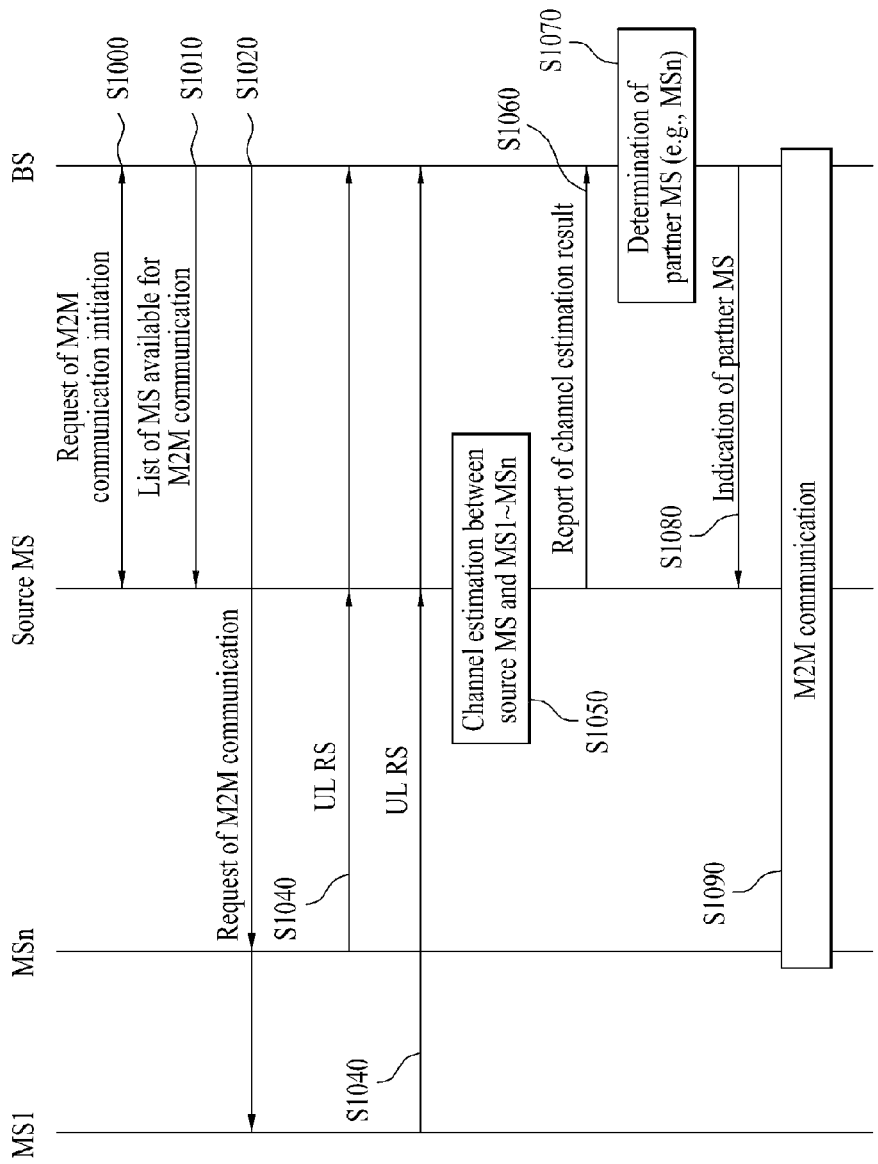

The BS may notify the source MS of information (hereinafter, CC-MS list) on neighboring MSs of the source MS, which may enable direct communication and assist client cooperative communication (FIG. 6, FIG. 7 and FIG. 9, S1010). The BS may configure the CC-MS list on the basis of a location based service (LBS) such as GPS and paging group. The source MS may transmit a message requesting the M2M communication to its neighboring MSs on the basis of the CC-MS list (FIG. 7, S1030). Otherwise, regardless of the CC-MS list, the source MS may transmit a message requesting the M2M communication to its neighboring MSs (FIG. 8, S1030). Otherwise, the BS may transmit a message requesting the M2M communication with the source MS to the neighboring MSs within the CC-MS list on the basis of the CC-MS list (FIG. 9, S1030).

In the meantime, the source MS may collect channel information on MSs within the CC-MS by using an uplink (UL)

reference signal transmitted from the MSs listed in the CC-MS list, among UL reference signals transmitted from the neighboring MSs, without the step of requesting the neighboring MSs of the M2M communication from the BS or the source MS (FIG. 6, S1040 and S1050).

Figure 5:
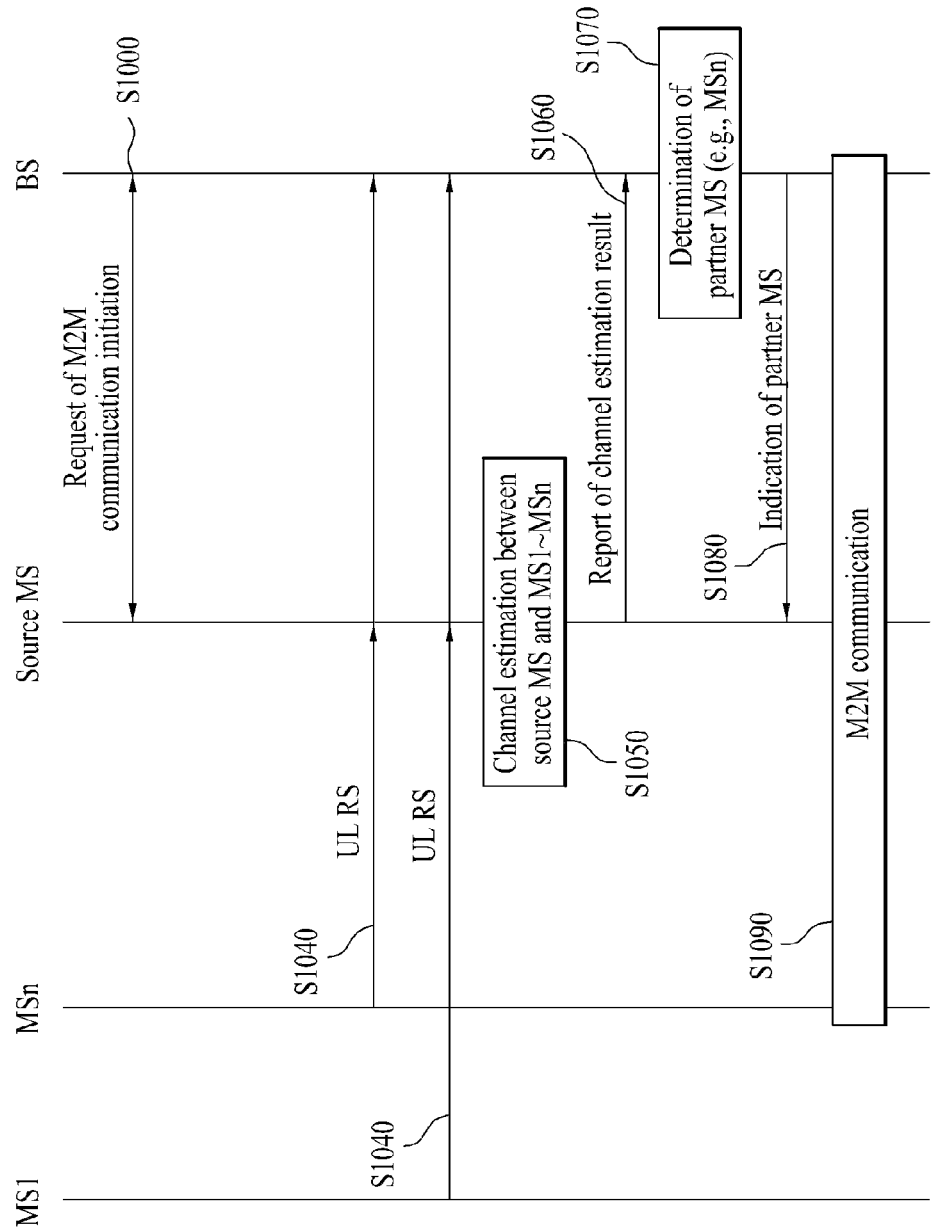
FIG. 5 to FIG. 9 are diagrams illustrating examples of M2M communication initiation procedure according to the first scheme.

UL reference signals transmitted from arbitrary MSs located near the source MS to the BS and/or the source MS may be received without the CC-MS list (FIG. 5 and FIG. 8, S1040), and then channel quality between the source MS and the neighboring MSs may be measured (FIG. 5 and FIG. 8, S1050).

Referring to FIG. 5 to FIG. 9, in estimating the channels status between the source MS and the neighboring MSs, the source MS receives UL reference signal transmitted for channel estimation between the neighboring MSs and the BS from the neighboring MSs (S1040), and measures channel quality between the source MS and the neighboring MSs (S1050). The reference signal means a special waveform signal which is previously defined to be known by the BS and the MS and transmitted from the BS to the MS or from the MS to the BS. Examples of the reference signal may include a pilot, midamble, preamble, sounding channel, and random access preamble used for initial or periodic ranging.

In the first scheme of the present invention, the source MS is operated as a mode that may receive signals of the neighboring MSs for UL interval of a normal frame. For example, the source MS may replace an uplink (UL) subframe having a symbol, to which UL reference signal is transmitted, with downlink (DL) subframe, and may receive the UL reference signal for the DL subframe.

Generally, the frame used in the wireless communication system includes a predetermined number of subframes. For example, in the 3GPP LTE-A system, each radio frame having a length of 10 ms may include ten subframes of an equal size. In the IEEE 802.16m, a radio frame having a length of 80 ms may include four superframes, each of which includes four frames. Each frame may include eight subframes. Each subframe includes a plurality of OFDM symbols in a time domain and a plurality of subcarriers in a frequency domain. The frame is configured differently depending on a duplex mode. In a frequency division duplex (FDD) mode, UL transmission and DL transmission are identified from each other by frequency, and one frame includes only UL subframes or only DL subframes. In a time division duplex (TDD) mode, UL transmission and DL transmission are identified from each other by time, and subframes within one frame are classified into UL subframes and DL subframes.

In the FDD mode, the source MS replaces a full band of UL frequency bandwidth or a band of the UL frequency bandwidth, to which the UL reference signal is transmitted, with DL frequency bandwidth, and receives the UL reference signal of neighboring MS(s) on the replaced frequency bandwidth. In the TDD mode, the source MS replaces a whole or part of a predetermined UL subframe from among a plurality of subframes constituting one frame, which includes a symbol in which UL reference signal is transmitted, with DL subframe, and receives UL reference signal of neighboring MS(s) on the replaced time interval.

In case of the TDD mode, an idle time exists for the time when UL is changed to DL or vice versa. This idle time will be referred to as a transition time (TT). It is general that the reference signal is transmitted on a given location so that the reception apparatus may easily detect the reference signal. If it is defined such that the UL reference signal is transmitted on the center of the subframe, the source MS operated in the TDD mode replaces a whole or part of UL subframe having a symbol, tin which the UL reference signal is transmitted, with DL subframe, and configures a radio frame to obtain a transition time enough before and after the replaced interval. Alternatively, in order to reduce throughput loss of the source MS, which occurs in the procedure of collecting information on the neighboring MSs, to the maximum range, the idle time or the transition time of the conventional frame structure may be used as the interval for receiving the neighboring UL reference signal. For example, it is defined such that the UL reference signal is transmitted in the first symbol or the last symbol of the UL transmission interval configured by one or more UL subframes, the source MS shifted to DL mode to receive the reference signal of the neighboring MS continues to be operated in the DL mode without being transited to the DL mode after being re-transited to UL mode. Accordingly, it is advantageous in that the transition time is reduced.

The source MS measures MS-MS channel status between the MS and the neighboring MSs on the basis of the UL reference signals of the neighboring MSs (S1050). The source MS may transmit information on MSs having a good channel status to a destination BS as partner MS candidate groups on the basis of the measured result (S1060). Alternatively, the source MS may transmit the measured channel quality information of the entire neighboring MSs to the destination BS (S1060). In order that the BS may identify the neighboring MSs selected by the source MS, the source MS may transmit identifiers of the selected neighboring MSs (MS IDs) or information, which may estimate MS ID, to the BS (S1060). Hereinafter, the information related to the channel status between the neighboring MSs and the source MS, which is measured by the source MS on the basis of the UL reference signals of the neighboring MSs, will be referred to as a channel estimation result. In other words, the source MS transmits the channel estimation result estimated on the basis of the UL reference signals of the neighboring MSs to the BS (S1060).

The conventional UL reference signal transmitted from the conventional MS to the BS for channel status estimation between the BS and the conventional MS may be used as the reference signal for M2M communication. Alternatively, a separate reference signal for M2M communication may be defined for the M2M communication. The reference signal for M2M communication may be defined to identify MS ID through masking based on MS ID. However, it may be not easy to identify MSs through masking based on the MS ID. In this case, the reference signal for M2M communication may be designed to identify MS ID between MSs within the CC-MS list or a predetermined number of MSs. The source MS and the neighboring MSs may be signaled information indicating what the reference signal for M2M communication corresponding to the predetermined number of MSs is, from the BS or another source MS. The neighboring MSs may transmit a corresponding M2M reference signal pattern on the basis of the information, and the source MS may identify the neighboring MSs on the basis of the information, detect corresponding reference signals for M2M communication of the neighboring MSs and estimate a channel between the source MS and the neighboring MS (S1050). In order that the source MS may detect reference signals for M2M communication of the neighboring MSs on predetermined time/frequency domains (regions), the BS may broadcast/multicast information indicating a region to which the reference signals for M2M communication are transmitted, to the MSs. A plurality of reference signal patterns for identifying the reference signals for the predetermined number of MSs in the time domain and/or the frequency domain may be defined.

In the meantime, the information for identifying the neighboring MS selected by the source MS may be signaled to the BS indirectly in such a manner that the source MS transmits resource information such as time/frequency/code detected from the reference signal of the corresponding neighboring MS to the BS. The BS may identify the neighboring MS selected by the source MS on the basis of the resource information. In this case, the BS may transmit signal system information, which may be used to analyze a signal system of a predetermined structure operated in a system expected to be used by the neighboring MS or a system used by the neighboring MS, to the source MS. The source MS may detect the reference signal for the neighboring MS on the basis of the signal system information, and may transmit information indicating a resource detecting the reference signal of the neighboring MS, to the BS together with channel status information between the neighboring MS and the source MS, which is measured on the basis of the reference signal of the neighboring MS (S1060).

The BS determines a partner MS, which will perform M2M communication with the source MS, from among the neighboring MSs on the basis of the channel status between the source MS and the neighboring MSs, which is received from the source MS, and the channel status between the neighboring MSs and the BS, which is known by the BS (S1070). The BS may estimate the channel status with the neighboring MSs on the basis of the UL reference signals of the neighboring MSs. The neighboring MS may be configured to transmit the UL reference signal for channel status estimation between the neighboring MS and the BS to the BS by masking the UL reference signal with its MS ID, whereby the BS or another neighboring/source MS may identify the MS that has transmitted the UL reference signal. Alternatively, the BS may know the channel status with the neighboring MS on the basis of a value fed back from the neighboring MSs, wherein the value is obtained by estimating the channel status between the neighboring MSs and the BS on the basis of DL reference signal for channel estimation, which is transmitted from the BS. The BS may further consider the amount of resources, which may be used by the neighboring MS, and a battery headroom of the neighboring MS in determining the partner MS. The BS may notify the source MS and/or the partner MS of information indicating the determined MS (S1080).

In the meantime, the source MS may detect an energy of a signal (or reverse signal) transmitted from the neighboring MSs to the base station for a specific time period and transmit information indicating the corresponding neighboring MS and the order of the detected energy amount as the channel estimation result (S1060). The BS that has received the information may know the neighboring MS that has used a channel through which the source MS may receive a signal with high energy, in accordance with the order of the energy amount detected by the source MS. In this case, the BS may estimate interference at the above channel by using a power control related parameter and/or MCS level used for the neighboring MSs, and may determine a neighboring MS (for example, MSn), which uses a region where the source MS may receive a signal with high energy even excluding the interference, as the partner MS (S1070). Alternatively, the source MS may determine the neighboring MS (for example, MSn), which enables the most efficient transmission, as the partner MS by calculating transmission efficiency of the entire channel from the neighboring MS to the BS and the channel of the neighboring MS (S1070). The BS may notify the source MS and the MSn that the MSn is the partner MS (S1080). Alternatively, if the BS notifies that source MS that the MSn is the partner MS (S1080), the source MS may notify the MSn that the MSn is the partner MS of M2M communication.

The source MS performs M2M communication with the partner MS (S1090). The M2M communication may be direct communication in which the source MS directly exchanges user data with the partner MS. Also, the M2M communication may be client cooperation communication in which the partner MS receives UL data of the source MS and transmits the received UL data to the BS or receives DL data from the BS and transmits the received DL data to the source MS.

Figure 10:
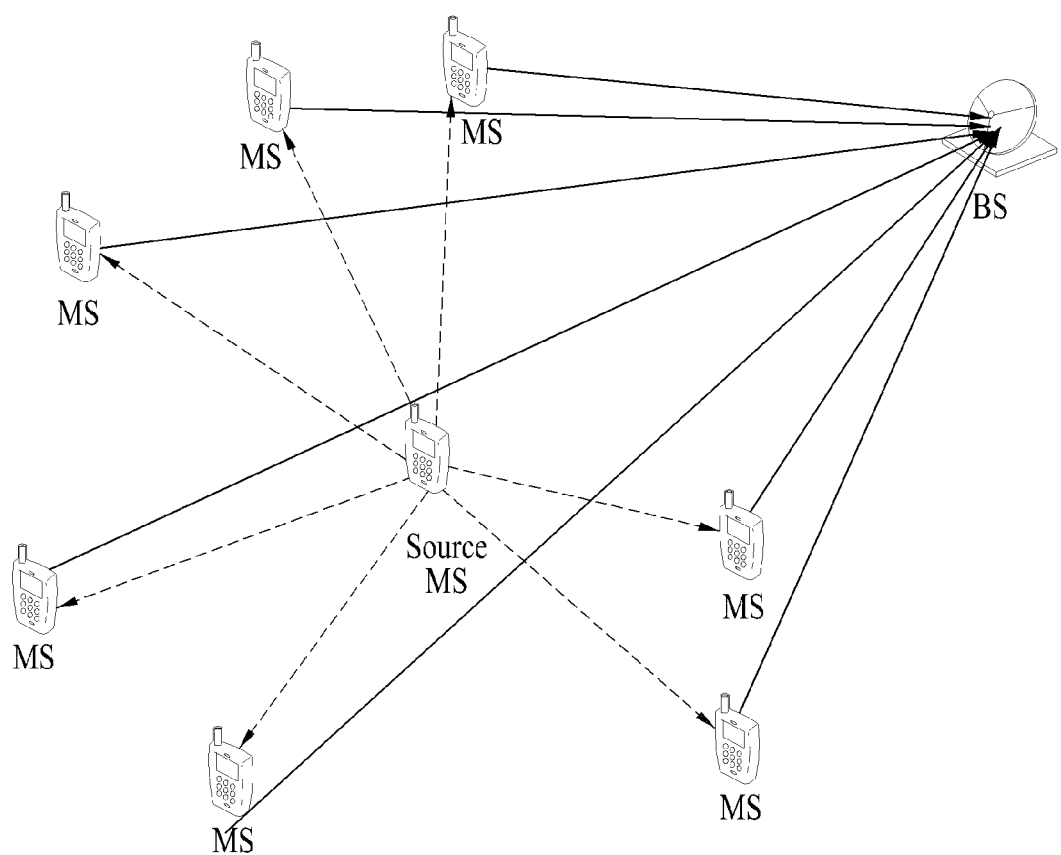
FIG. 10 is a diagram illustrating a second scheme of the present invention, which collects measurement information of neighboring mobile stations MSs of a source mobile station MS.

FIG. 10 is a diagram illustrating a second scheme of the present invention, which collects measurement information of neighboring MSs of a source MS. Unlike the first scheme in which the source MS collects channel status information on the neighboring MSs, according to the second scheme of the present invention, the neighboring MSs collect the channel status information with the source MS. In FIG. 10, a dotted line represents transmission of a reference signal for channel quality/status estimation, and a solid line represents transmission of the estimated result to the destination BS. If the channel information between the source MS and the neighboring MS is collected in the same manner as FIG. 10, since the source MS only knows information on the MS determined as the partner MS not all the neighboring MSs, it is advantageous in that the security risk such as personal information leaks, which is caused as MS information is shared between the source MS and the neighboring MSs, may be reduced. This is remarkably advantageous in the embodiments in which M2M communication is performed in a state that the CC-MS list is not provided to the source MS.

FIG. 11 to FIG. 16 are diagrams illustrating examples of M2M communication initiation procedure according to the second scheme. In FIG. 11 to FIG. 16, the same reference numerals mean the same operation. Also, an operation corresponding to reference numerals which do not exist in FIG. 11 to FIG. 16 but exist in the other drawings represents an operation which is not performed in the embodiments of FIG. 11 to FIG. 16.

Referring to FIG. 11 to FIG. 16, the source MS may determine M2M communication and request the BS to initiate M2M communication (S2000). In other words, the M2M communication may be initiated by the source MS. Otherwise, the BS may determine the M2M communication of the source MS and request the source MS to initiate the M2M communication (S2000). In other words, the M2M communication may be initiated by the BS.

Figure 11:
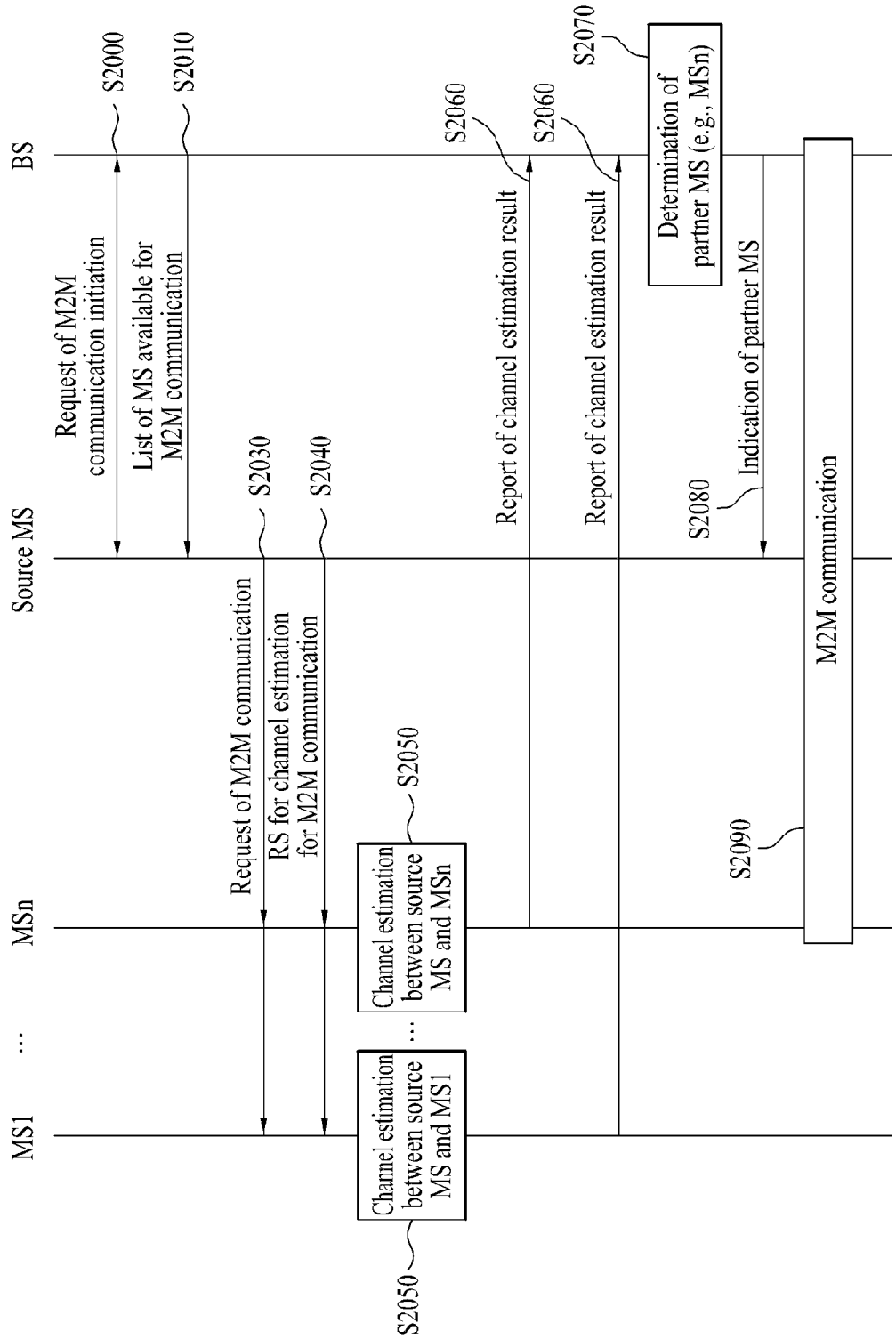
FIG. 11 to FIG. 16 are diagrams illustrating examples of M2M communication initiation procedure according to the second scheme.
Figure 12:
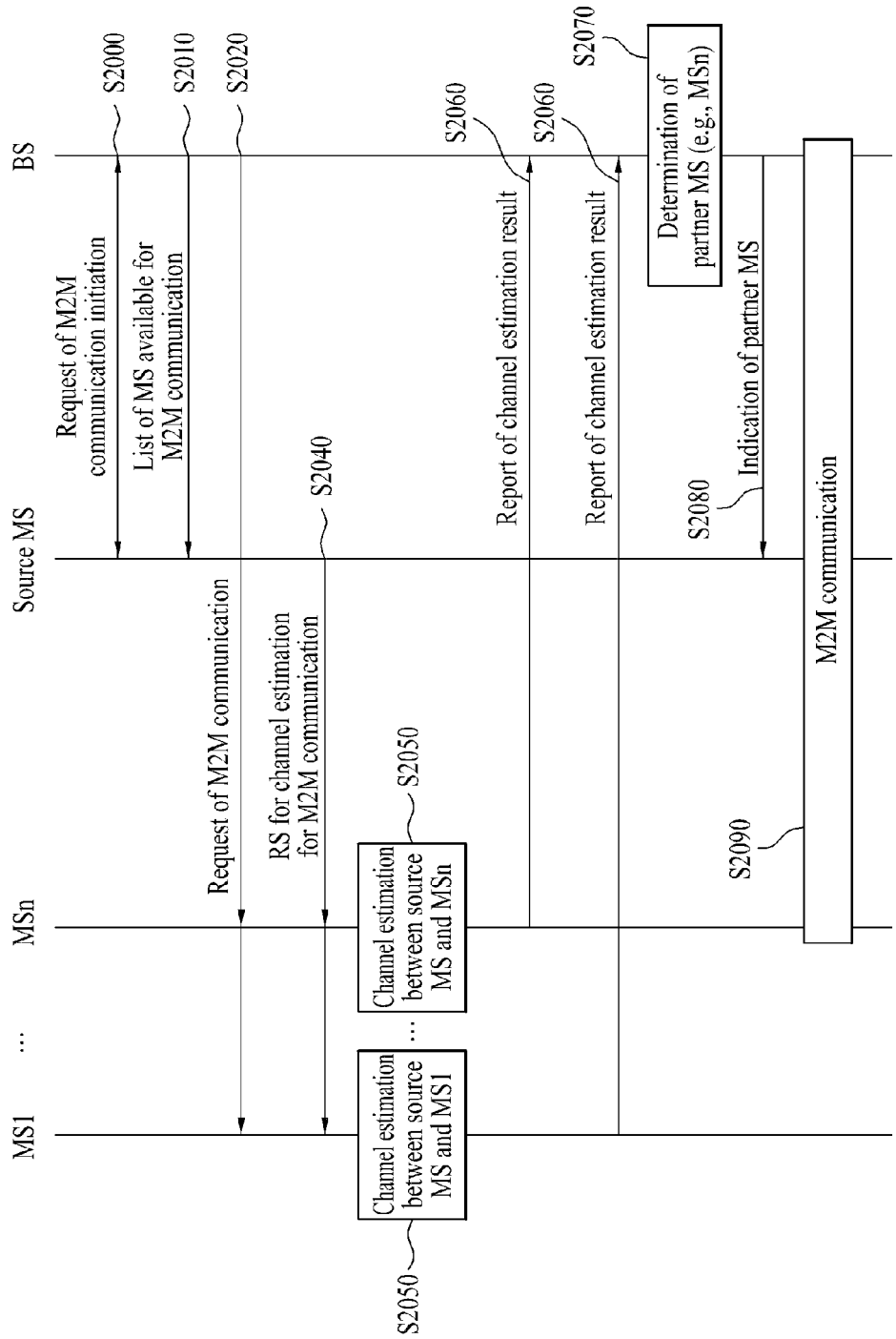
Figure 13:
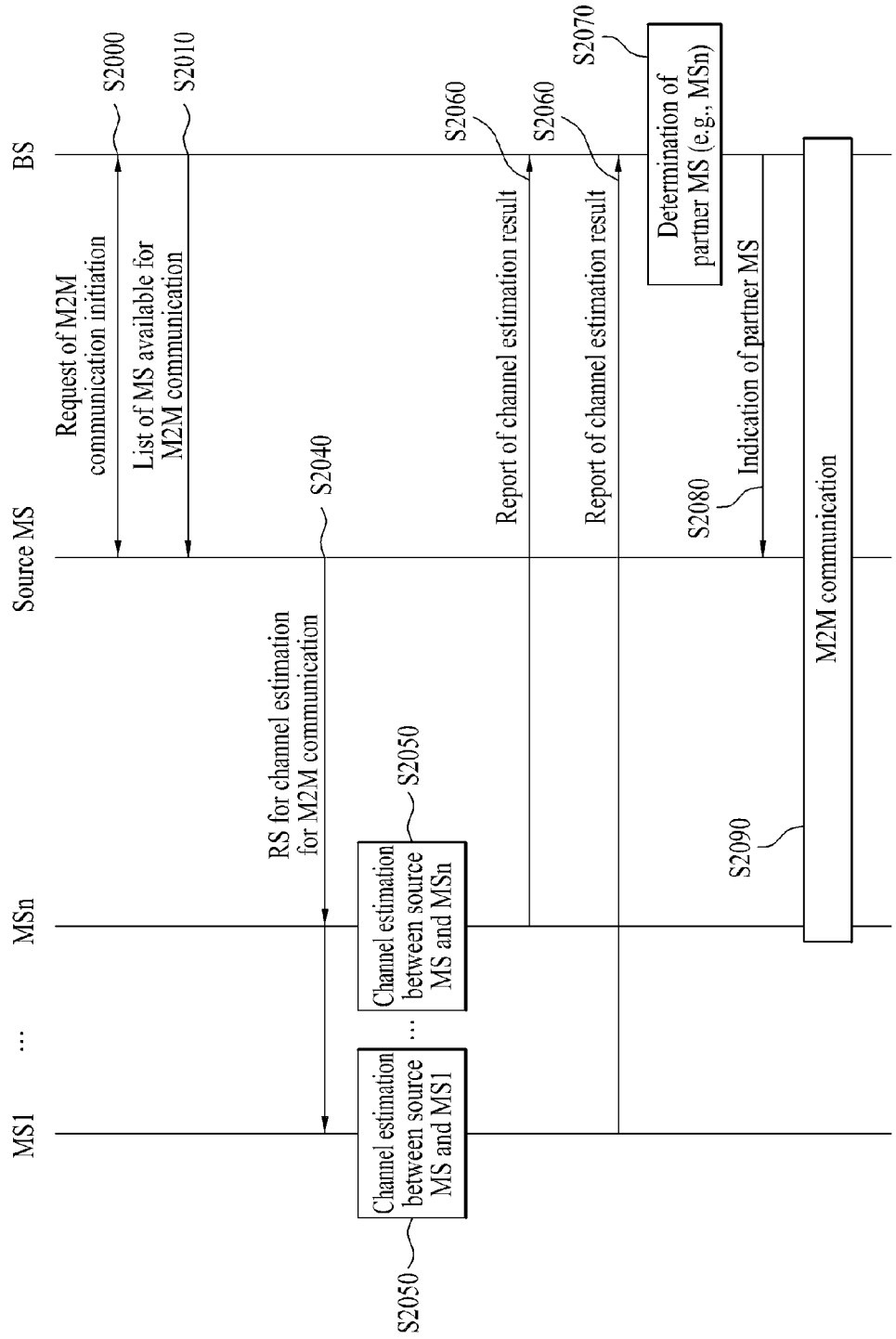

The MSs that collect channel information for M2M communication may be determined without specific restriction, or may be limited to only mobile stations which belong to a specific group (for example, mobile station group that supports M2M communication). The mobile station of the specific group may be selected by the BS from among mobile stations expected to be located near the source MS based on LBS, paging group based service, etc. The BS may provide a list of mobile stations belonging to the specific group to the source MS to prevent the neighboring MSs, which cannot be a partner MSs, from being involved in the M2M communication initiation procedure. For example, the BS may notify the source MS of the CC-MS list which is the information on neighboring MSs of the source MS, which may enable direct communication or assist client cooperation communication (FIG. 11 to FIG. 13, S2010). The source MS may transmit a message requesting M2M communication to its neighboring MSs on the basis of the CC-MS list (FIG. 11, S2030), and may transmit a reference signal (hereinafter, reference signal for M2M communication) for channel estimation for M2M communication to the neighboring MSs (FIG. 11, S2040). Otherwise, the BS may transmit a message requesting M2M communication to the neighboring MSs of the source MS on the basis of the CC-MS list (FIG. 12, S2020), and the source MS may transmit a reference signal for M2M communication to the neighboring MSs on the basis of the CC-MS list received from the BS (FIG. 12, S2040). The request of M2M communication may be replaced with transmission of the reference signal for M2M communication from the source MS to the neighboring MSs of the source MS on the basis of the CC-MS list (FIG. 13, S2040).

Figure 14:
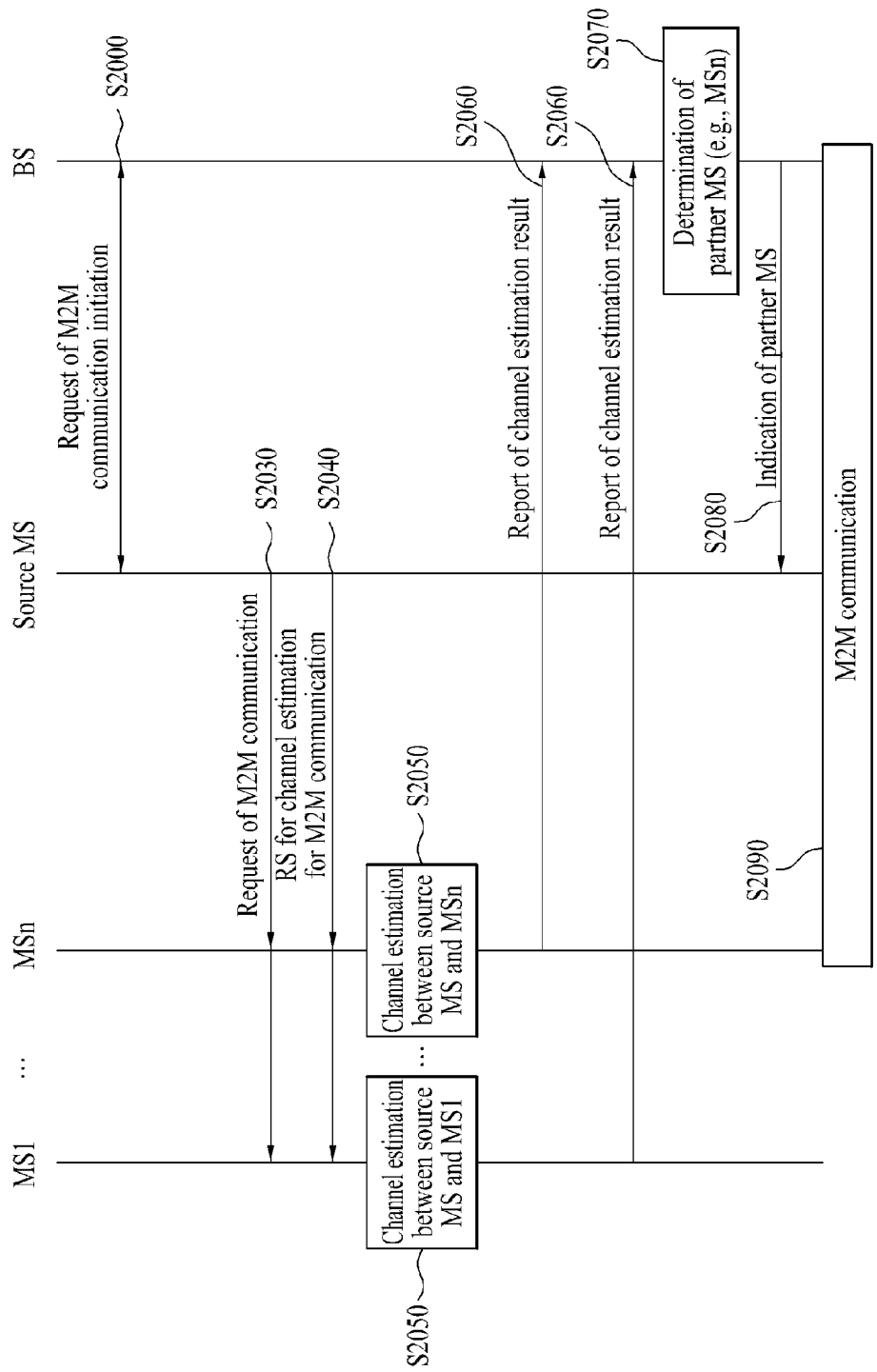
Figure 15:
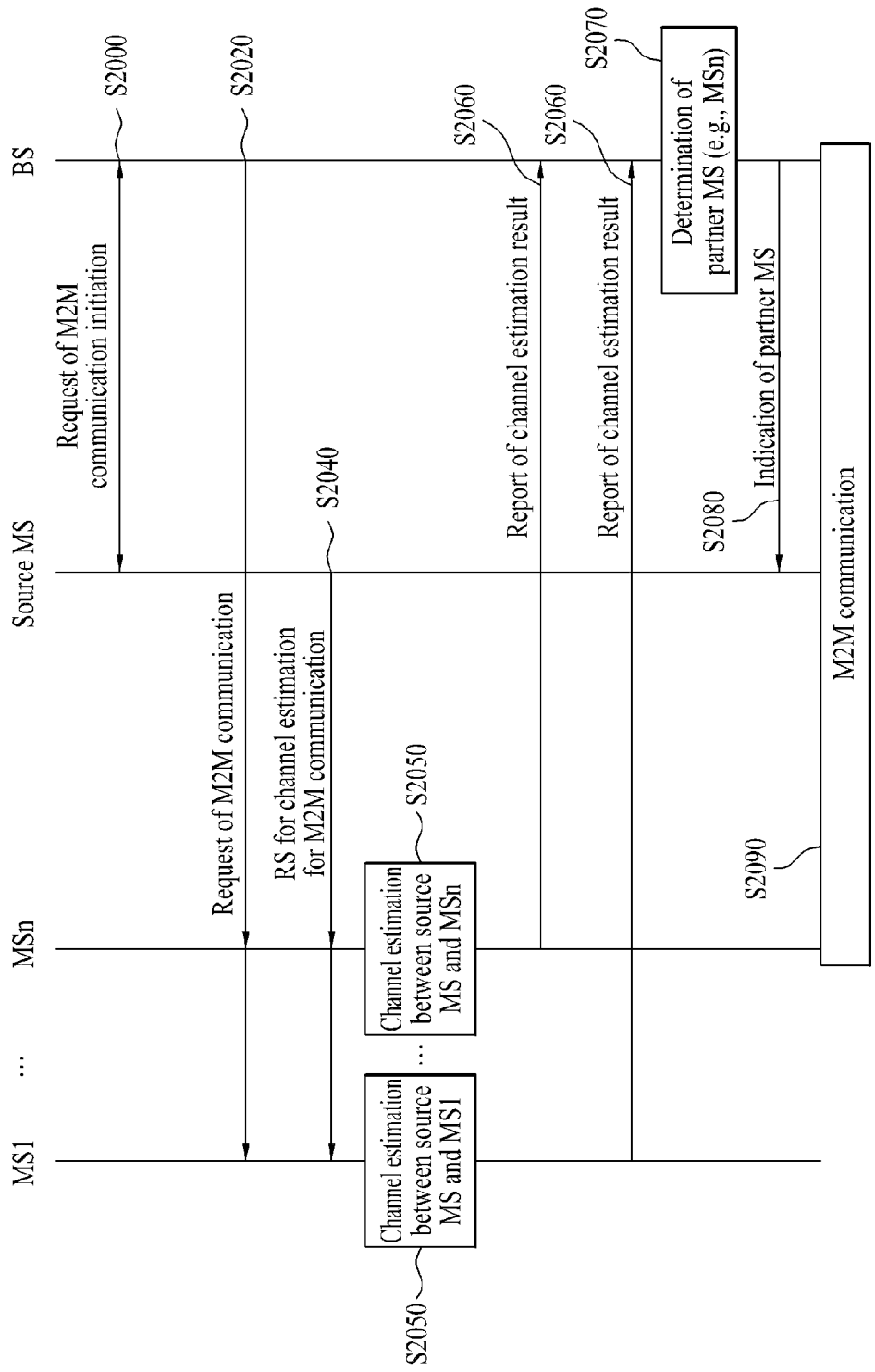
Figure 16:
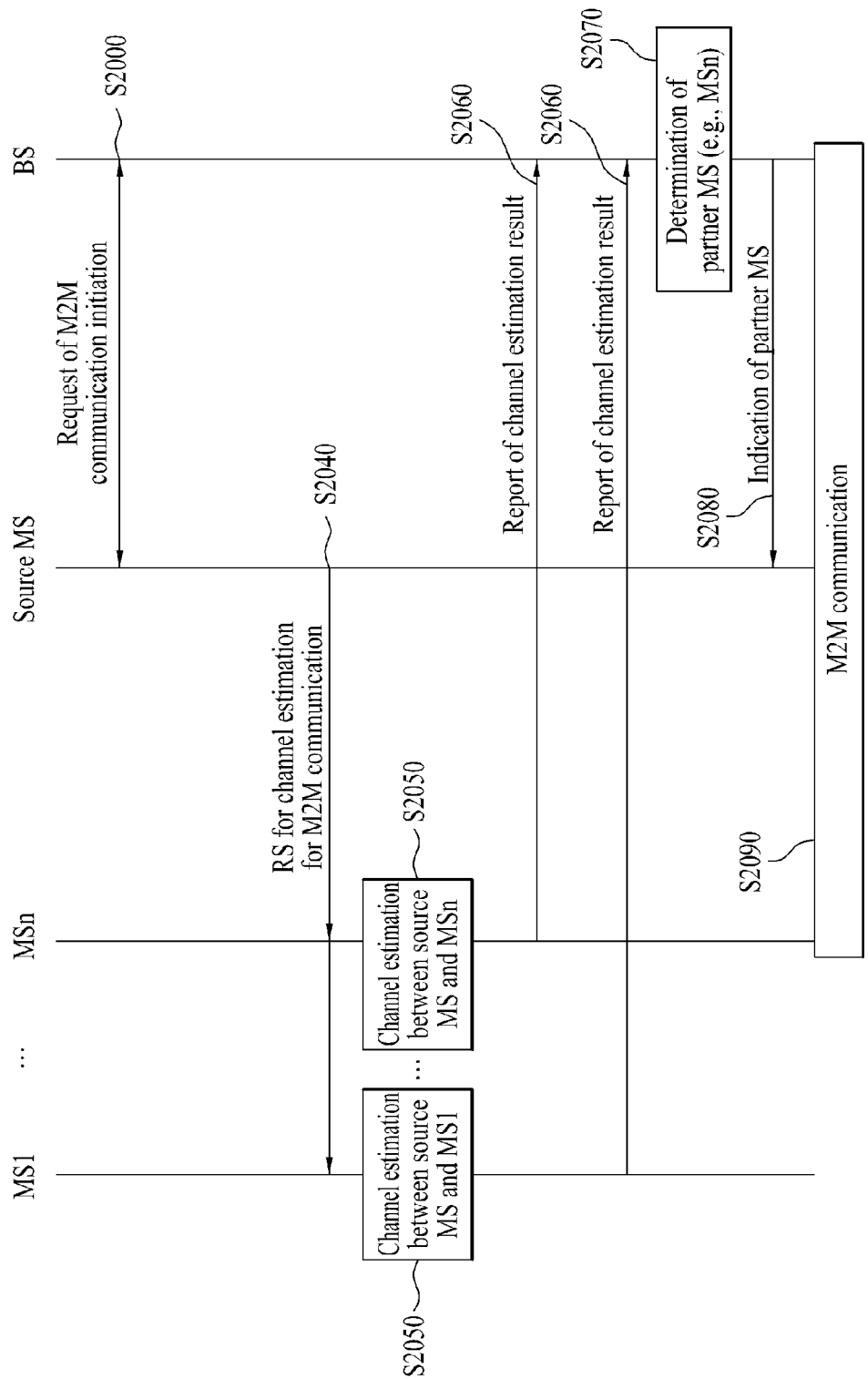

In the meantime, the source MS may transmit a request message of M2M communication and a reference signal for M2M communication to MSs, which are expected to be located at a predetermined region near the source MS, without the CC-MS list (FIG. 14 to FIG. 16) (FIG. 14, S2030 and S2040). In this case, the MSs that receive the request message of M2M communication and the reference signal for M2M communication may be limited to the MSs belonging to a group (for example, a group of MSs that may support and perform M2M communication) which is previously determined. The BS may transmit the message of M2M communication to the neighboring MSs within the CC-MS list without transmitting the CC-MS list to the source MS (FIG. 15, S2020), and may command the neighboring MSs to receive the reference signal for M2M communication from the source MS. Meanwhile, the source MS may transmit the reference signal for M2M communication to random MS(s) within a predetermined region near the source MS without the M2M communication request message (FIG. 16, S2040). Among the MSs within the predetermined region, the MSs that may perform M2M communication may collect channel information for M2M communication as follows.

Referring to FIG. 11 to FIG. 16, the source MS, which determines M2M communication or is requested M2M communication from the BS, transmits a reference signal for channel estimation between the source MS and the neighboring MS for a predetermined time interval and/or a predetermined frequency interval (S2040). For example, the source MS operated by the TDD mode transmits the reference signal for channel estimation for M2M communication to the neighboring MS for DL (or UL) time interval, and the source MS operated by the FDD mode transmits the reference signal for channel estimation for M2M communication to the neighboring MS at a DL (or UL) bandwidth. If the DL transmission interval is used for transmission of the reference signal for M2M communication, the source MS replaces a general DL interval with UL interval for transmitting the reference signal to the neighboring MSs. For example, the source MS may replace a DL subframe having a symbol in which a DL reference signal is transmitted, with UL subframe and use the subframe for transmission time of the reference signal for M2M communication and transition time. If it is defined such that the DL reference signal is transmitted on the center of the subframe, the source MS replaces a whole or part of DL subframe having a symbol, in which the DL reference signal is transmitted, with UL subframe, and configures a radio frame to obtain a transition time enough before and after the replaced interval. Alternatively, in order to reduce throughput loss of the source MS, which occurs in the procedure of collecting channel information between the neighboring MS and the source MS, to the maximum range, a time interval, which includes the idle time or the transition time of the conventional frame structure, may be used as the transmission interval of the reference signal for M2M communication.

The conventional UL reference signal transmitted from the source MS to perform channel estimation between the BS and the source MS may be used as the reference signal for M2M communication, or a reference signal for M2M communication may newly be defined.

By the BS, the source MS may be allocated with time and/or frequency resource regions for transmitting a specific signal (for example, reference signal for M2M communication). Also, the reference signal for M2M communication transmitted from the source MS to the BS may be transmitted through time and/or frequency resource regions (for example, separate channel for M2M communication or reference signal for M2M communication, or random access channel) which are previously determined. The neighboring MSs that may perform M2M communication should receive, from the BS, information for receiving the reference signal for M2M communication from the source MS, that is, various kinds of information (for example, modulation and coding scheme (MCS), MIMO parameter, resource allocation, etc.) related to the transmission mode. If the UL transmission interval is used for transmission of the reference signal for M2M communication, the neighboring MS should be operated in the reception mode for the UL transmission interval to receive the UL reference signal transmitted from the source MS. In order to control this operation, the BS may transmit control information for operation control between the source MS and the neighboring MS through DL of a macro cell. The control information may include information as to UL interval where the neighboring MS should receive the reference signal for M2M communication transmitted from the source MS, information as to a resource location where the reference signal for M2M communication is received, and MCS or MIMO information related to a structure of the reference signal for M2M communication.

The neighboring MSs within the macro cell, which enable direct communication or client cooperation communication, detect a signal of the source MS on the resource region which the BS allocates to the source MS for transmission of the reference signal for M2M communication. If the power or quality of the signal of the source MS is more than a specific level, the neighboring MSs may transmit a parameter as to whether the signal of the source MS has been detected and/or as to the detected value to the BS. Referring to FIG. 11 to FIG. 16, the neighboring MSs requested implicitly or explicitly from the source MS or the BS to join M2M communication receive a DL reference signal for M2M communication from the source MS and estimates or measures a channel status between itself and the source MS by using the DL reference signal for M2M communication (S2050). Each of the neighboring MSs transmits the estimated or measured result to the BS (S2060). Among the neighboring MSs, only the MSs having a good channel status may transmit the above result to the BS (S2060). The neighboring MSs that transmit the channel estimation result to the BS may mask the channel estimation result with its MS ID, whereby the BS may identify the channel estimation result and the corresponding MS.

The BS may determine the partner MS, which will perform M2M communication with the source MS, on the basis of the channel status between the source MS and the neighboring MSs, which is reported from the neighboring MSs (S2070). The BS considers channel status between the BS and the neighboring MSs in determining the partner MS. The BS may estimate the channel status with the neighboring MSs on the basis of the UL reference signal of the neighboring MSs. The neighboring MS may transmit the UL reference signal to the BS by masking it with its MS ID, whereby the BS or another neighboring/source MS may identify the MS that has transmitted the UL reference signal. Otherwise, the BS may know the channel status with the neighboring MS on the basis of a value fed back from the neighboring MSs, wherein the value is obtained by estimating the channel status between the neighboring MSs and the BS on the basis of the DL reference signal for channel estimation, which is transmitted from the BS. The BS may further consider the amount of resources, which may be used by the neighboring MS, and a battery headroom of the neighboring MS in determining the partner MS.

The BS may notify the source MS and/or the partner MS of information indicating the determined MS (S2080). For example, the BS may determine MSn as the partner MS (S2070) and notify the source MS and the MSn of the determined fact (S2080). Otherwise, if the BS notifies the source MS that the MSn is the partner MS (S2080), the source MS may notify the MSn that the MSn is the partner MS of M2M communication.

The source MS performs M2M communication with the partner MS (S2090). The M2M communication may be direct communication in which the source MS directly exchanges user data with the partner MS. Also, the M2M communication may be client cooperation communication in which the partner MS receives UL data of the source MS and transmits the received UL data to the BS or receives DL data from the BS and transmits the received DL data to the source MS.

In FIG. 4 to FIG. 16, the BS may determine the plurality of neighboring MSs as the partner MSs. If the plurality of partner MSs join M2M communication with the source MS, how the plurality of partner MSs will transmit or receive data to and from the source MS or the BS on a predetermined time and/or predetermined frequency should be defined. If the plurality of partner MSs detect a signal transmitted from the source MS and transmit data to the BS or receives data, which will be transmitted to the source MS, from the BS, since they exist within coverage where the BS provides a communication service, and are synchronized with the BS, they may transmit or receive the data of the source MS by using the same format. Otherwise, as the BS designates a transmission mode per partner MS, the plurality of partner MSs may transmit or receive the data of the source MS to and from the BS by using their respective signal features different from one another. For example, if the BS performs cooperation transmission to all of the partner MSs, it may control the partner MSs to transmit or receive the data of the source MS to and from the BS by using the same MCS and the same MIMO mode. For another example, the BS may differently set information on MCS or resource, MIMO mode, etc, per partner MS through explicit or implicit indication in accordance with a given rule. As a result, transmission diversity may be obtained between the BS and the source MS, and effective client cooperative communication may be performed.

In determining the partner MS in accordance with the embodiments of FIG. 4 to FIG. 16, the BS may consider the channel status between the source MS and the neighboring MSs, the channel status between the neighboring MSs and the BS, and the status of the neighboring MSs, for example, battery status, whether the neighboring MS is currently performing M2M communication with another MS, radio resource status, etc. In the embodiments of FIG. 4 to FIG. 9, the source MS may collect the status information of the neighboring MSs and transmit the status information to the BS together with the channel information. In the embodiments of FIG. 10 to FIG. 16, the neighboring MSs may transmit its status information to the BS.

Figure 17:
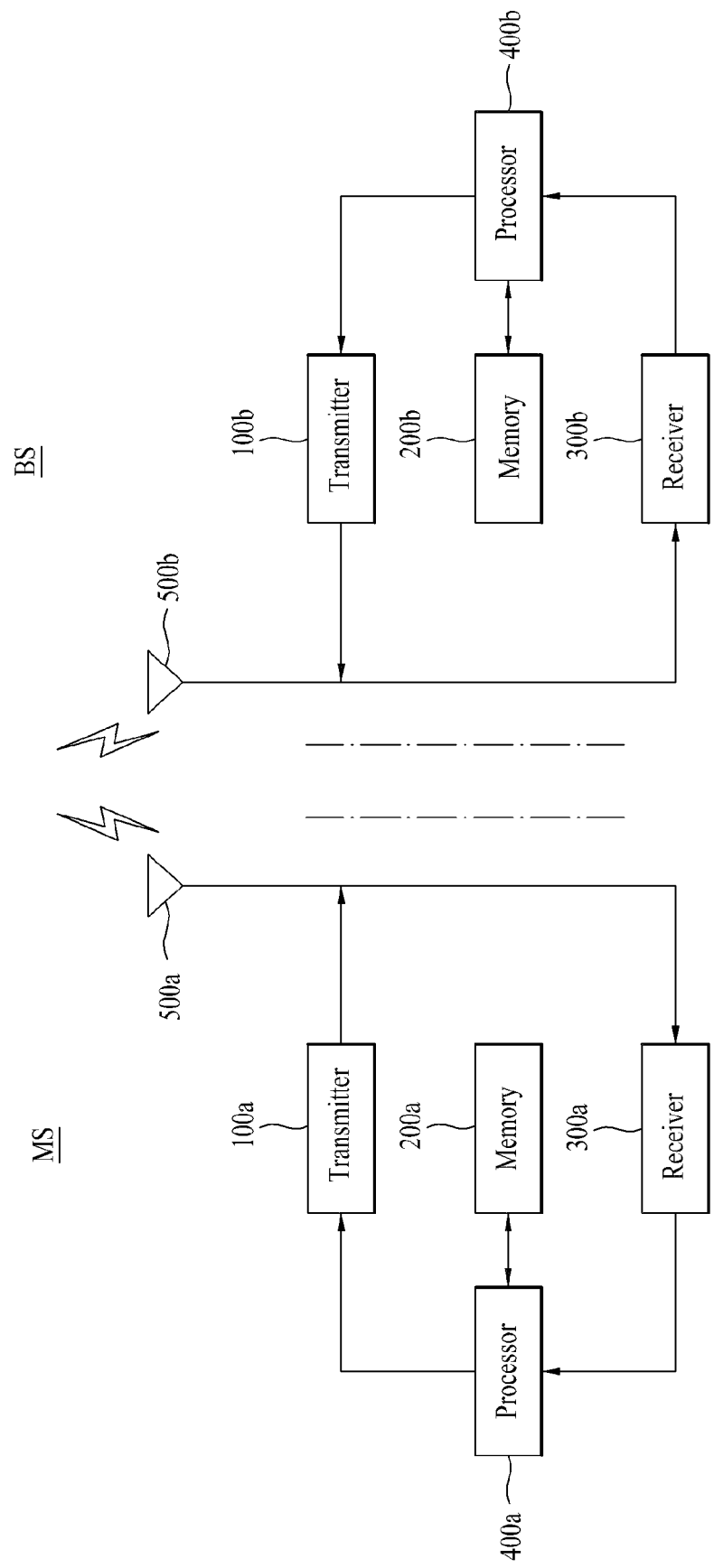
FIG. 17 is a block diagram illustrating a mobile station (MS) and a base station (BS), which performs the present invention.

FIG. 17 is a block diagram illustrating a mobile station (MS) and a base station (BS), which perform the present invention.

The mobile station is operated as a transmission apparatus on an uplink and as a reception apparatus on a downlink. By contrast, the base station may be operated as a reception apparatus on the uplink and as a transmission apparatus on the downlink.

The MS and the base station include antennas $500a$ and $500b$ for receiving information, data, signals, and/or messages, transmitters $100a$ and $100b$ for transmitting messages by controlling the antennas $500a$ and $500b$, receivers $300a$ and $300b$ for receiving messages by controlling the antennas $500a$ and $500b$, and memories $200a$ and $200b$ for storing various kinds of information associated with communication in the wireless communication system. Also, the MS and the base station further include processors $400a$ and $400b$, respectively, which are adapted to perform the present invention by controlling the components of the mobile station and the base station, such as the transmitters $100a$ and $100b$, the receivers $300a$ and $300b$, and the memories $200a$ and $200b$. The transmitter $100a$, the memory $200a$, the receiver $300a$, and the processor $400a$ in the MS may be configured as independent components by separate chips or their separate chips may be incorporated into a single chip. Likewise, the transmitter $100b$, the memory $200b$, the receiver $300b$, and the processor $400b$ in the base station may be configured as independent components on separate chips or their separate chips may be incorporated into a single chip. The transmitter and the receiver may be configured as a single transceiver in the mobile station or the base station.

The antennas $500a$ and $500b$ transmit signals generated from the transmitters $100a$ and $100b$ to the outside, or transfer radio signals received from the outside to the receivers $300a$ and $300b$. The antennas $500a$ and $500b$ may be referred to as antenna ports. Each of the antenna ports may correspond to one physical antenna or may be configured by combination of physical antennas more than one. If the transmitters $100a$ and $100b$ and/or the receivers $300a$ and $300b$ support a Multiple Input Multiple Output (MIMO) function using a plurality of antennas, each of them may be connected to two or more antennas.

The processors $400a$ and $400b$ generally provide overall control to the modules of the MS and the base station. Especially, the processors $400a$ and $400b$ may carry out a control function for performing the present invention, a Medium Access Control (MAC) frame variable control function based on service characteristics and a propagation environment, a power saving mode function for controlling idle-mode operations, a handover function, and an authentication and encryption function. The processors $400a$ and $400b$ may also be referred to as controllers, microcontrollers, microprocessors, microcomputers, etc. Meanwhile, the processors $400a$ and $400b$ may be achieved by hardware, firmware, software, or their combination. If the present invention is implemented by a hardware configuration, the processors $400a$ and $400b$ may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. Meanwhile, if the present invention is implemented by a firmware or software configuration, firmware or software may be configured to include a module, a procedure, a function, etc. for performing functions or operations of the present invention. This firmware or software may be provided in the processors $400a$ and $400b$, or may be stored in the memories $200a$ and $200b$ and driven by the processors $400a$ and $400b$.

The transmitters $100a$ and $100b$ perform predetermined coding and modulation for signals and/or data, which are scheduled by schedulers connected with the processors $400a$ and $400b$ and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the MS and the base station may be configured in different manners depending on the procedures of processing transmitted signals and received signals.

The memories 200a and 200b may store a program for processing and control of the processors 400a and 400b, or may perform a function for temporarily storing input/output information therein. The memories 200a and 200b may be used as buffers. The memories may be implemented using at least one type of a flash memory type, a hard disk type, a multimedia card micro type, a card-type memory (e.g., a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

The MS of the present invention is configured to perform any one of the embodiments of the present invention described in FIG. 4 to FIG. 16. In order to perform the aforementioned embodiments of the present invention, the MS of the present invention is basically implemented to perform the following operations.

(1) The MS of the present invention is configured to receive some or all of signals transmitted from another MS and decode the received signals. The MS processor 400a according to the present invention may control the MS receiver to receive the signals transmitted from another MS and decode the received signals. The MS receiver 300a according to the present invention is configured to receive some or all of the signals transmitted from another MS and decode the received signal under the control of the MS processor 400a.

(2) The MS of the present invention may transmit the signal on the DL band or DL time interval. The MS processor 400a of the present invention controls the MS transmitter 100a to perform UL transmission on the DL frequency band and/or DL time interval (for example, DL subframe). The MS transmitter 100a performs UL transmission to the BS or another MS on the DL frequency band and/or DL time interval under the control of the MS processor 400a.

(3) The MS of the present invention may receive the signal on the UL band or UL time interval. The MS processor 400a of the present invention controls the MS receiver 300a to perform DL transmission on the UL frequency band and/or UL time interval (for example, UL subframe). In other words, the MS receiver 300a may receive the signal transmitted from the BS or another MS on the UL frequency band and/or UL time interval under the control of the MS processor 400a.

(4) All of the MSs that support M2M communication transmits information (for example, the amount of resources available for M2M communication, battery headroom, etc.) for M2M communication to the BS periodically or in accordance with a request of the BS.

In FIG. 4 to FIG. 16, the source MS processor 400a determines to initiate M2M communication and transmits a message requesting initiation of the M2M communication to the BS by controlling the source MS transmitter 100a (S1000, S2000). Otherwise, the BS processor 400b determines to initiate M2M communication and transmits a message requesting initiation of the M2M communication to the source MS by controlling the BS transmitter 100b (S1000, S2000). The BS processor 400b may generate a list (CC-MS list) of the MS, which may perform M2M communication, among the MSs located near the source MS. Also, the BS processor 400b may control the BS transmitter 100b to transmit the CC-MS list to the source MS (S1010, S2010). Also, the BS processor 400b may control the BS transmitter 100b to transmit a message requesting to join the M2M communication to the neighboring MSs of the source MS (S1020, S2020). Meanwhile, the source MS processor 400a may control the source MS transmitter 100a to transmit a message requesting to join the M2M communication to the MSs located near the source MS (S1020, S2030).

In FIG. 4 to FIG. 9, the source MS receiver 300a receives a reference signal for channel estimation, which is transmitted from a random MS located near the source MS or MS (hereinafter, referred to as neighboring MS) listed in the CC-MS list under the control of the source MS processor 400a (S1040). The source MS processor 400a measures/estimates channel quality/status between the source MS and each neighboring MS by using the reference signals of the neighboring MSs, which are received by the source MS receiver 300a (S1050). The source MS processor 400a controls the source MS transmitter 100a to report the measured/estimated result of the channel quality/status (hereinafter, referred to as channel estimation result) to the BS (S1060). The source MS processor 400a may control the source MS transmitter 100a to transmit partner MS candidates or channel quality value, received energy detection value, etc. to the BS as the channel estimation result.

In FIG. 10 to FIG. 16, the source MS processor 400a controls the source MS transmitter 100b to transmit a reference signal for channel estimation for M2M communication to a arbitrary MS located near the source MS or MS (hereinafter, referred to as neighboring MS) listed in the CC-MS list (S2040). The processors 400a of the neighboring MSs measure/estimate channel quality/status with the source MS by using the reference signal on a predetermined resource region from the source MS (S2050). All or some MS processors 400a of the neighboring MSs control the neighboring MS transmitter 100a to transmit the corresponding channel estimation result to the BS (S2060). Each processor 400a of the MSs that report the channel estimation result may control the neighboring MS transmitter 100a to transmit channel quality value, received energy detection value, etc. to the BS as the channel estimation result.

In FIG. 4 to FIG. 16, the BS receiver 300b receives the channel estimation result indicating the channel status between the source MS and the corresponding neighboring MS from the source MS or the neighboring MSs (S1060, S2060). The BS processor 400b determines the partner MS, which will perform M2M communication with the source MS, on the basis of the channel estimation result transmitted from the source MS or the neighboring MS(s) and the channel status between the BS and the neighboring MS (S1070, S2070). For example, the BS processor 400b may determine the partner MS from among the neighboring MSs having a good channel status with the source MS and a good channel status with the BS. The BS processor 400b controls the BS transmitter 100b to transmit information indicating the determined partner MS to the source MS. The BS processor 400b may control the BS transmitter 100b to transmit information indicating that the neighboring MS has been determined as the partner MS of M2M communication to the neighboring MS determined as the partner MS. The source MS processor 400a may control the source MS transmitter 100a and the source MS receiver 300a to perform M2M communication with the partner MS.

If the M2M communication is client cooperative communication, the processor 400a of the partner MS may control the receiver 300a of the partner MS to receive UL data from the source MS, and may control the transmitter 100a of the partner MS to transmit the UL data to the BS. Also, the processor 400a of the partner MS may control the receiver 300a of the partner MS to receive DL data for the source MS, which is transmitted from the BS, and may control the transmitter 100a of the partner MS to transmit the DL data to the source MS.

The BS processor 400b may control the BS transmitter 100b to transmit control information required for M2M communication to the source MS and/or the partner MS.

In the M2M communication initiation procedure according to the embodiments of the present invention, the source MS or the partner MS, which performs M2M communication with the source MS, may not perform a separate process until the M2M communication is operated. Accordingly, it is advantageous in that unnecessary consumption of the radio resources is reduced. Also, according to the embodiments of the present invention, the M2M communication may be supported by only modifications such as masking or addition of MS ID with the existing reference signal for channel quality estimation of the MS. In other words, it is advantageous in that the M2M communication may be used for the wireless communication system even without lots of modifications for the existing system. Also, according to the embodiments of the present invention, since the BS finally controls the M2M communication, it is advantageous in that load of the MS having a relatively poor calculation performance or power is reduced. Moreover, according to the embodiments of the present invention, since there is no essential information that should be shared between the source MS and the neighboring MS in addition to the reference for channel quality estimation between the MSs, it is advantageous in that the amount of radio resources required for the M2M communication initiation procedure is reduced.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be applied to a wireless communication system. In more detail, the present invention may be applied to a base station and a mobile station in a wireless communication system.

The invention claimed is:

1. A method for performing, by a first mobile station, a mobile station to mobile station communication in a wireless communication system, the method comprising:
receiving, by the first mobile station, reference signals for channel estimation, which are transmitted from one or more mobile stations;
measuring, by the first mobile station, channel quality between each of the one or more mobile stations and the first mobile station by using the reference signals for channel estimation;
transmitting, to a base station, information indicating the channel quality between each of the one or more mobile stations and the first mobile station;
receiving, from base station, information indicating which mobile station among the one or more mobile stations is a second mobile station with which the first mobile station is to perform the mobile station to mobile station communication; and
transmitting data directly to the second mobile station.

2. The method according to claim 1, wherein the second mobile station is determined considering channel quality between each of the one or more mobile stations and the base station together with the channel quality between each of the one or more mobile stations and the first mobile station.

3. A method for supporting, by a base station, a mobile station to mobile station communication in a wireless communication system, the method comprising:
receiving, by the base station, information indicating channel quality between each of one or more mobile stations and a first mobile station from the first mobile station;
determining, by the base station, which mobile station among the one or more mobile stations is a second mobile station with which the first mobile station is to perform the mobile station to mobile station communication on the basis of the information indicating the channel quality; and
transmitting, by the base station, information indicating the second mobile station, to which the first mobile station is to transmit data directly, to the first mobile station.

4. The method according to claim 3, wherein the base station determines the second mobile station considering channel quality between each of the one or more mobile stations and the base station together with the channel quality between each of the one or more mobile stations and the first mobile station.

5. A first mobile station for performing a mobile station to mobile station communication in a wireless communication system, the first mobile station comprising:
a receiver and a transmitter; and
a processor configured to control the receiver and the transmitter,
wherein the processor is configured to
control the receiver to receive reference signals for channel estimation, which are transmitted from one or more mobile stations,
measure channel quality between each of the one or more mobile stations and the first mobile station by using the reference signals for channel estimation,
control the transmitter to transmit, to a base station, information indicating the channel quality between each of the one or more mobile stations and the first mobile station,
control the receiver, from the gase station, to receive information indicating which mobile station among the one or more mobile stations is a second mobile station with which the first mobile station is to perform the mobile station to mobile station communication, and
control the transmitter to transmit data directly to the second mobile station.

6. The first mobile station according to claim 5, wherein the second mobile station is determined considering channel quality between each of the one or more mobile stations and the base station together with the channel quality between each of the one or more mobile stations and the first mobile station.

7. A base station for supporting a mobile station to mobile station communication in a wireless communication system, the base station comprising:
- a receiver and a transmitter; and
- a processor configured to control the receiver and the transmitter,
- wherein the processor is configured to
  - control the receiver to receive information indicating channel quality between each of one or more mobile stations and a first mobile station from the first mobile station,
  - determine, on the basis of the information indicating channel quality, which mobile station among the one or more mobile stations is a second mobile station with which the first mobile station is to perform the mobile station to mobile station communication, and
  - control the transmitter to transmit information indicating the second mobile station, to which the first mobile station is to transmit data directly, to the first mobile station.

8. The base station according to claim 7, wherein the processor is configured to determine the second mobile station considering channel quality between each of the one or more mobile stations and the base station together with the channel quality between each of the one or more mobile stations and the first mobile station.

* * * * *